United States Patent
Leonard et al.

(10) Patent No.: US 6,721,784 B1
(45) Date of Patent: Apr. 13, 2004

(54) SYSTEM AND METHOD FOR ENABLING THE ORIGINATOR OF AN ELECTRONIC MAIL MESSAGE TO PRESET AN EXPIRATION TIME, DATE, AND/OR EVENT, AND TO CONTROL AND TRACK PROCESSING OR HANDLING BY ALL RECIPIENTS

(75) Inventors: Jon N. Leonard, Tucson, AZ (US); Michael Bernstein, Tucson, AZ (US)

(73) Assignee: Poofaway.com, Inc., Tucson, AZ (US)

( * ) Notice: Subject to any disclaimer, the term of this patent is extended or adjusted under 35 U.S.C. 154(b) by 0 days.

(21) Appl. No.: 09/475,112

(22) Filed: Dec. 30, 1999

Related U.S. Application Data

(63) Continuation-in-part of application No. 09/390,363, filed on Sep. 7, 1999.

(51) Int. Cl.[7] ............................................. G09G 5/00
(52) U.S. Cl. ................................... 709/206; 709/204
(58) Field of Search .......................... 345/748, 749, 345/752; 379/93.24; 709/204, 205, 206, 207; 713/165, 171, 167, 170; 380/277, 278

(56) References Cited

U.S. PATENT DOCUMENTS

| | | | |
|---|---|---|---|
| 5,014,234 A | | 5/1991 | Edwards, Jr. |
| 5,125,075 A | | 6/1992 | Goodale et al. |
| 5,325,310 A | | 6/1994 | Johnson et al. |
| 5,598,279 A | | 1/1997 | Ishii et al. |
| 5,734,901 A | * | 3/1998 | Sidhu et al. ............... 709/206 |
| 5,764,898 A | | 6/1998 | Tsuji et al. |
| 5,790,790 A | | 8/1998 | Smith et al. |
| 5,862,325 A | | 1/1999 | Reed et al. |
| 5,864,684 A | * | 1/1999 | Nielsen ..................... 709/206 |
| 5,870,548 A | | 2/1999 | Nielsen |
| 5,872,925 A | | 2/1999 | Han |
| 5,877,755 A | | 3/1999 | Hellhake |
| 5,878,230 A | | 3/1999 | Weber et al. |
| 5,892,900 A | | 4/1999 | Ginter et al. |
| 5,910,987 A | | 6/1999 | Ginter et al. |
| 5,915,019 A | | 6/1999 | Ginter et al. |
| 5,917,912 A | | 6/1999 | Ginter et al. |
| 5,920,861 A | | 7/1999 | Hall et al. |

(List continued on next page.)

OTHER PUBLICATIONS

Netscape 2 Simplified; IDG Books Worldwide, Inc.; 1995; pp. 112–113 and 120–123.*

*Primary Examiner*—Kristine Kincaid
*Assistant Examiner*—Le Nguyen
(74) *Attorney, Agent, or Firm*—Bacon & Thomas, PLLC

(57) ABSTRACT

An electronic mail system and method enables the originator of a message sent by electronic mail to select a date, time, or event at which the message and all incarnations of the message to self-destruct, regardless of the number and types of computers or software systems that may have interacted with the message, and/or to include processing and handling limitations. The necessary control over the message is achieved by encrypting the message and enabling viewing only through a viewer applet arranged to facilitate destruction of the message upon the occurrence of the selected expiration time, date, or event, and/or to implement the handling and processing limitations. A central server can be used to exercise additional control over the message by serving as a proxy destination, and by transmitting the encrypted message to the viewer applet. In the case where a central mail server is required to enable forwarding of messages, the central server tracks the messages and compiles lists including the identities of all individuals or groups to whom the message has been forwarded, and information on handling of the message by those to whom the message has been sent or forwarded.

29 Claims, 16 Drawing Sheets

U.S. PATENT DOCUMENTS

| | | |
|---|---|---|
| 5,951,636 A | 9/1999 | Zerber |
| 5,958,005 A | 9/1999 | Thorne et al. |
| 5,978,836 A * | 11/1999 | Ouchi .................. 709/203 |
| 6,005,945 A * | 12/1999 | Whitehouse ............ 380/51 |
| 6,061,448 A * | 5/2000 | Smith et al. ............ 380/277 |
| 6,128,739 A * | 10/2000 | Fleming, III ............ 709/246 |
| 6,167,435 A * | 12/2000 | Druckenmiller et al. .... 709/206 |
| 6,185,603 B1 * | 2/2001 | Henderson et al. ........ 709/206 |
| 6,324,569 B1 * | 11/2001 | Ogilvie et al. ............ 707/500 |
| 6,442,600 B1 * | 8/2002 | Anderson ................ 709/217 |

\* cited by examiner

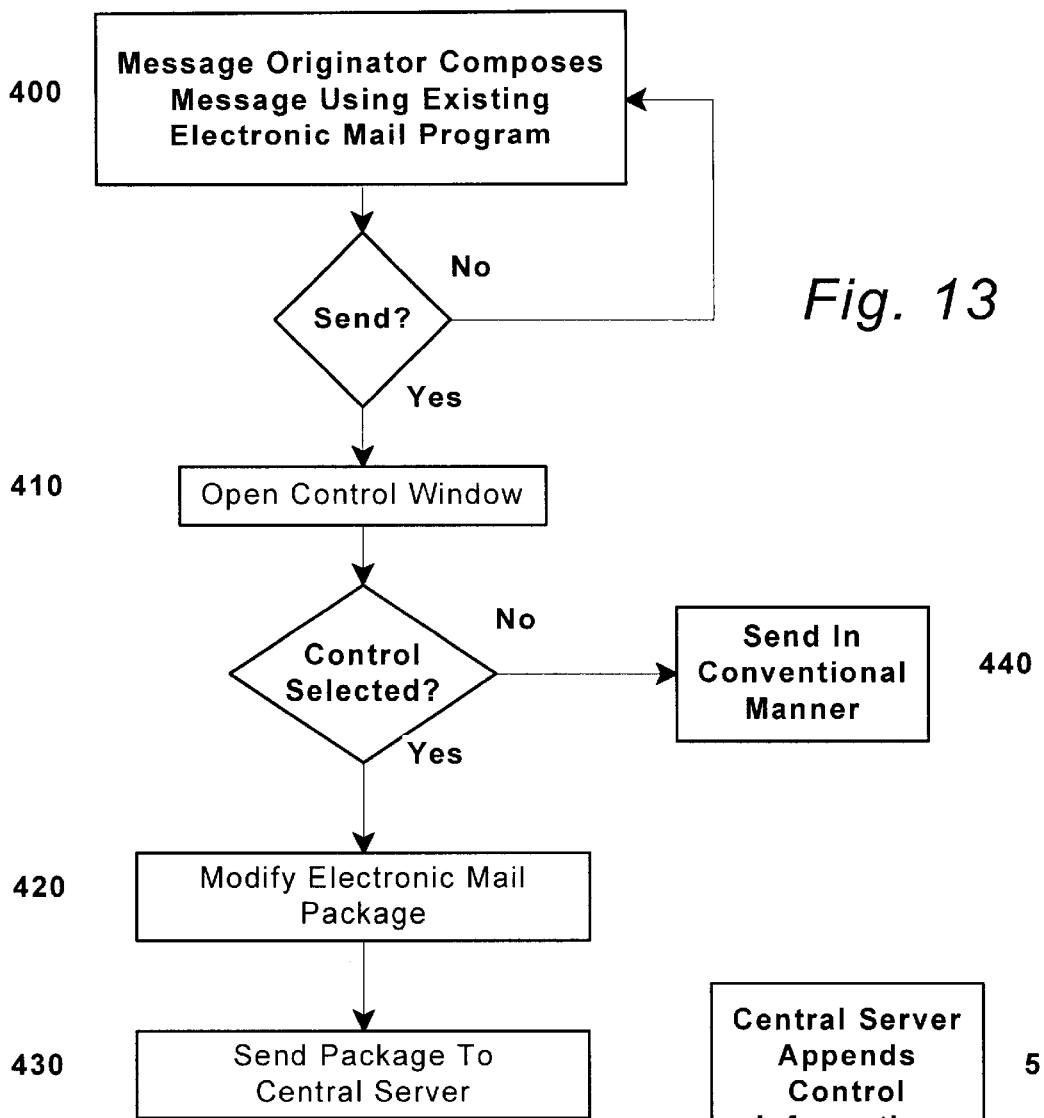
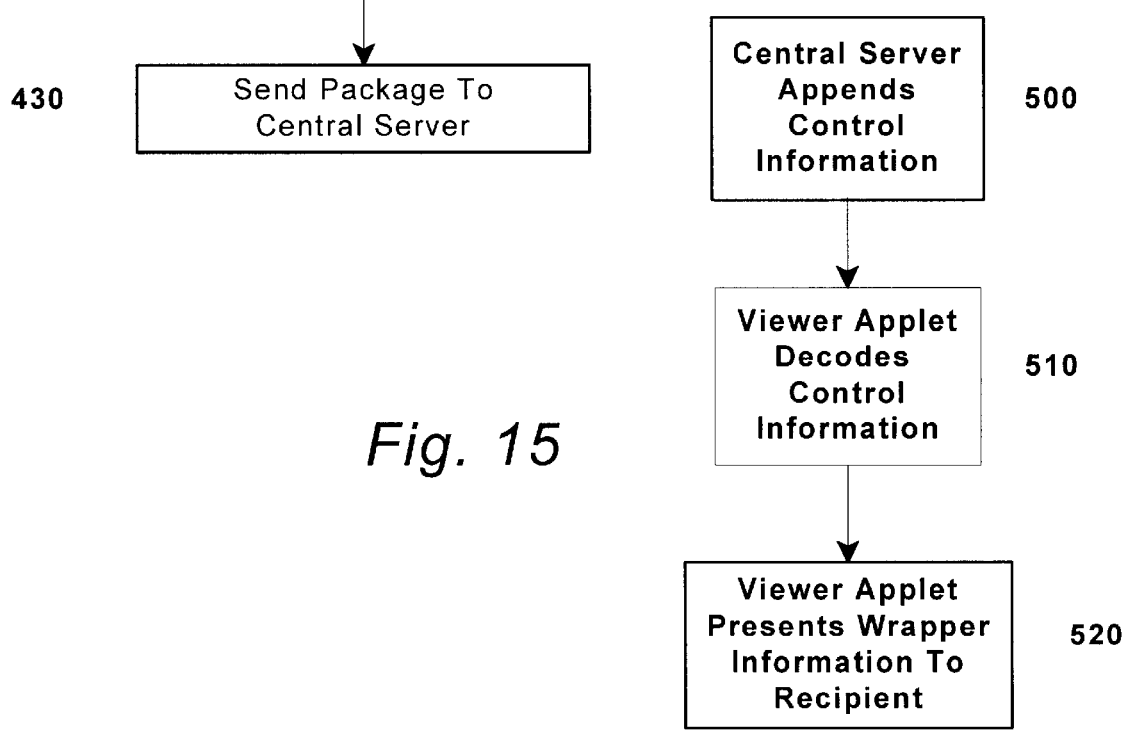
Fig. 13
Fig. 15

SYSTEM AND METHOD FOR ENABLING THE ORIGINATOR OF AN ELECTRONIC MAIL MESSAGE TO PRESET AN EXPIRATION TIME, DATE, AND/OR EVENT, AND TO CONTROL AND TRACK PROCESSING OR HANDLING BY ALL RECIPIENTS

CROSS-REFERENCE TO RELATED APPLICATION

This application is a continuation-in-part of U.S. patent application Ser. No. 09/390,363, filed Sep. 7, 1999.

BACKGROUND OF THE INVENTION

1. Field of the Invention

This invention relates to various improvements on the electronic mail system and method described in U.S. patent application Ser. No. 09/390,363, herein incorporated by reference.

The improvements are (i) the addition to the systems described in the parent application of an electronic mail control applet that allows the sender or originator of an electronic mail message to control the lifespan and handling of the message after it is sent while using his or her existing electronic mail application to create, modify, and send the message; (ii) the addition of a feature that allows, for purposes of maximizing the efficiency of lifespan and handling control of a message after sending, the addition or deletion of electronic mail wrapper information such as the time of sending; (iii) in embodiments where a central mail server is used, the use of session keys, key renewals, or required check-ins to enable central server control of message access while permitting storage of the message on the recipient's computer, or retention by the central server of parts of the electronic mail package, such as the message wrapper, handling and encryption key information, and/or portions of the message, with storage of the remainder of the message on the recipient's computer; and (iv) in embodiments that require handling of forwarded electronic mail message by a central mail server, the addition of message tracking and compilation of lists including the identities of individuals or groups to whom the message has been forwarded, and information on handling of the message by those to whom the message has been sent or forwarded.

2. Description of Related Art

The following description of "related art" consists of seven sections (i)–(vii). The first section begins with a general description of the properties of electronic mail that serve to define the context of the invention. The second section is a discussion of a prior art system that purports to provide a framework for controlling distribution of electronic documents in general, known as the "virtual distribution environment" (VDE) and disclosed in U.S. Pat. Nos. 5,892,900, 5,910,987, 5,915,019, and 5,917,912. The third section of this description of related art describes systems specific to electronic mail and that provide controls of such processing or handling functions as forwarding and reply, while the fourth section describes a system, disclosed in U.S. Pat. No. 5,870,548, that provides for cancellation of electronic mail messages after sending. The fifth section of this description of related art discusses a patent related to delivery of an interactive television program in relation to the feature of the invention involving distribution of a viewer applet to facilitate control of expiration date and processing functions. The sixth section summarizes the differences between the prior art and the concepts disclosed in the parent application, and the seventh section discusses the context and specific problems addressed by the improvements disclosed in the present continuation-in-part application.

(i) Definition of "Electronic Mail"

Electronic mail can be defined as a system or method for transmitting electronic data or text files from one computer to another based solely on a destination address without reference to the content of the files or, in general, to the route taken to reach the destination address, and in a form that permits the files to be accessed and manipulated at the destination address at the convenience of the recipient.

Electronic mail defined in this manner can be compared to postal mail, in which letters are routed solely to their destination based on addresses written on envelopes, the content of the messages being hidden in the envelopes, and the envelopes being placed in a mailbox for later retrieval at the convenience of the addressee.

Those skilled in the art will appreciate that the above definition is not the only possible definition of electronic mail, and that the systems, methods, and software described in the parent application and in the present continuation-in-part application, hereinafter referred to as "the invention," are therefore not necessarily to be limited by this definition. Instead, the definition is intended as an aid to understanding the manner in which the invention differs from other types of systems and methods which might, like the present invention, provide for sender controls and a limited lifespan for the transferred files, but which do not have the above characteristics of electronic mail. Examples of conventional file or data transfer systems that do not fall within the definition of electronic mail, but in which control of information is retained by the originator or sender, include video pay-per-view systems that rely on signal scrambling and the use of converter "boxes" to unscramble the signal and permit viewing of a video when payment has been received, and shareware or demonstration software downloads that self-destruct after a trial period if the shareware is not registered.

The "convenience of the recipient" aspect of the definition is important because it distinguishes electronic mail from real time electronic data transfers such as the file transfer protocol (FTP), and implies that electronic mail files must be stored somewhere and directly accessible at least once by the recipient at some time following receipt. It is this storage that gives rise to the problem addressed by the present invention, namely the extended life of an electronic mail message. While storage is an essential aspect of electronic mail, it will be appreciated that the files do not need to be stored in plain text form, and that the local storage need not be on the recipient's computer or even on a network server such as an IMAP server.

Another important aspect of the definition of electronic mail is that the files transferred are data or text files that contain information, rather than executable programs. It is a trivial matter to program self-destruction into an executable program, but a data or text file cannot be deleted without the aid of an external program, which in conventional electronic mail systems is entirely under the control of the recipient.

A third important aspect of the definition of electronic mail is that the electronic mail messages are relayed through a network of intermediate hubs based solely on the destination address, much as envelopes are handled by a conventional postal mail delivery system. The contents of an electronic mail object do not affect its ability to be delivered anymore than does the content of an envelope, and thus the data fields or contents of an electronic mail object can be formatted in any desired manner (with the exception of certain fields reserved for the writing of routing or tracking information that can be used for debugging). In particular, it is possible to insert flags that cause actions to be performed at the receiving end of the transmission, and that are unique to the sending and receiving software, without requiring new data structures or substantive revision of the conventional electronic mail protocols, and without affecting the transmission. In the case of Simple Mail Transfer Protocol (SMTP) transmission, these flags can be included as extensions of the destination address permitted by SMTP, or as an internal message header that is treated by SMTP as text or data and that is recognized only by the receiving software.

The broad definition of electronic mail given above can be implemented in numerous ways, and the present invention is intended to apply to all such implementations. The most common implementation is currently SMTP, which determines how electronic mail objects are routed to a destination address, and its related protocols, the Post Office Protocol (POP) or Internet Mail Access Protocol (IMAP), which set up "mailboxes" at the destination address, either locally or on a mail server, following transmission by SMTP. The invention is of course explicitly applicable to electronic mail sent via SMTP. In addition, messaging systems such as Lotus Notes™ may be considered to be within the definition of electronic mail for purposes of the invention.

(ii) "Virtual Distribution Environments" and the Concept of Control

In order to limit the lifespan of a message as in the invention, it is necessary to exercise some control over the message. As a result, any system that is capable of limiting the lifespan of a message also must be capable of enabling the sender to limit handling of the message, including forwarding, copying, printing, and so forth.

While providing such control is an important feature of the invention, it is not a unique feature. In fact, a system currently exists, at least in the form of a patent specification, which in theory provides all of the control necessary to achieve virtually any desired handling or lifespan limitations on any type of transferred file. The system is known as the Virtual Distribution Environment (VDE) and is disclosed in U.S. Pat. Nos. 5,892,900, 5,910,987, 5,915,019, and 5,917,912, all entitled "System and Methods For Secure Transaction Management and Electronic Rights Protection" (the VDE patents). The problem with VDE as a solution to the problem of message lifespan is that, in addition to not suggesting the concept of enabling the originator of an electronic mail file to control its lifespan, the controls implemented by VDE are too complex to be implementable through conventional mail protocols such as SMTP.

In general, there are three ways that control of a transferred file might be retained by the originator. The first, used for pay-per-view systems, is to prevent any copying or recording of the files, so that the files can only be viewed as they are being broadcast or downloaded. The second, used in the case of executable software downloads, is to include self-destruct instructions in the program instruction set. In the case of non-streaming, non-executable files, however, a third method is required. This is the method used by the presented invention, and is also the method implemented by VDE. In its most general form, this third method of transferred file control involves encryption of the files so that they can only be processed by software designed to implement the desired controls. The software that decrypts the files can be programmed to destroy the files at a desired date or upon the occurrence of a particular event, no matter how often the files have been copied or re-transmitted.

While the system and method described in the VDE patents thus utilizes the same general principle as the present invention, namely retaining control of files distributed over an open network by encrypting the files and utilizing software at the receiving end to exercise control over the files, including destruction of files (mentioned, for example, in col. 169, lines 61 et seq. of U.S. Pat. No. 5,917,912), and even protection of electronic mail (col. 278, lines 58 et seq. of U.S. Pat. No. 5,917,912), the details of the system and methods described in the VDE patents are substantially different than those of the present invention. Instead of utilizing existing communications protocols, VDE requires revision not only of the file origination, transmission, and receiving programs, but also "component, distributed, and event driven operating system technology, and related communications, object container, database, smart agent, smart card, and semiconductor design technologies" (Col. 8, lines 1–7 of U.S. Pat. No. 5,917,912). As a result, even though the VDE can be made to perform virtually any desired control function it is simply not practical in the context of electronic mail.

The impracticality of the systems disclosed in the VDE patents is explained at length in a later patent by the same assignee, U.S. Pat. No. 5,920,861, which compare VDE to a "blank canvas" on which the "master painter" can create his or her masterwork (col. 3, lines 1–12 of U.S. Pat. No. 5,920,861), but which is not suitable for use by the average end user. To solve the ease-of-use and interoperability problems, the later patent proposes to implement the generic template structure of the "virtual distribution environment" by creating a specific machine readable data structure. This solution to the problem is exactly opposite the solution provided by the present invention, which is to provide an applications level program that is completely compatible with existing protocols. This is possible because the present invention, unlike the VDE system, seeks to provide specific control functions such as the specification of an expiration date for a message, in a specific context, namely electronic mail. It designed to work within existing communications structures, and in particular within existing SMTP, POP, and IMAP formats, while providing a simple user interface that will be as familiar to the average electronic mail user, and as easy to use, as existing electronic mail programs.

(iii) Control in the Specific Context of Electronic Mail

While the VDE concept provides a framework by which sufficient control of electronic mail could be achieved so as to enable a sender to limit the lifespan of the electronic mail, the complexity of the VDE system and the skill required to implement and use the system makes the system unlikely to have any practical application to electronic mail as defined above.

On the other hand, those systems described in prior patents that are specifically directed to the concept of enabling originator control of electronic mail messages, for the most part to ensure that a message will be read or forwarded rather than to limit the lifespan, do not provide for a sufficient level of control, at least of messages sent over an open network, to ensure that all incarnations of a message will in fact be expunged. While it might seem that the advantages of providing sufficient control of electronic mail to ensure that messages can be made to expire at a time, date, or upon the occurrence of an event selected by the originator might have been grasped by designers of the prior systems, there are reasons why the advantages were in fact not apparent to such designers.

First, since electronic mail has been designed to be analogous to postal mail and postal mail has no function analogous to message expiration, except for the use of disappearing ink, it is likely that the concept of enabling the originator of a message to control the expiration and limit use of the message was simply not considered. The expiration of messages has previously been the province solely of fiction, exemplified by the self-destructing tape recorder in the opening scene of the television show Mission Impossible, and not as a way to give any sender of a message control of the lifespan of the message.

Second, the systems and methods disclosed in the prior patents are for the most part intended solely to force a response from the recipient, or facilitate distribution and forwarding of a mass mailing, with no consideration of what happens to the message after the response is made or the message is forwarded, and no provision for limiting either the lifespan or the use of a message once an appropriate response has been made.

For example, U.S. Pat. No. 5,325,310 discloses a system which prevents deletion of an electronic mail message until it has been viewed and/or forwarded, while U.S. Pat. No. 5,878,230 discloses a system designed to force a reply or forwarding, and U.S. Pat. No. 5,125,075 is one of several patents that disclose systems for controlling routing and access to electronic mail "circulars." It is not surprising that systems designed to ensure that an electronic mail message is read and disseminated in a desired manner have not provided for expiration of the messages being disseminated.

The only systems that actually provide for a limited message lifespan are those that automatically delete files after a predetermined period of time in order to clear space on a disk drive. These systems do not provide for originator control of the lifespan of the message, and in particular one that is to be sent over an open network rather than being retained on a local area network server. An example of this type of system is disclosed in U.S. Pat. No. 5,598,279, which describes a local area network server that provides for timed destruction of electronic mail and other files to save space on the server, but without the inclusion of an end-user interface that permits the originator of the electronic mail to select an expiration date, or any controls that would make such an interface possible.

(iv) Cancellation of an Electronic Mail Message-U.S. Pat. No. 5,870,548

The one patent that in a sense involves originator control of the lifespan or expiration of electronic mail messages is U.S. Pat. No. 5,870,548. However, the lifespan control provided by the system disclosed in this patent is in the form of the ability to cancel messages, rather than to select a lifespan prior to sending the message. As with the forwarding or response requiring systems, implementation of the cancellation message is left to the recipient, and no provision is made for dealing with of copies of the original message that have already been forwarded.

U.S. Pat. No. 5,870,548 can be fairly said to represent the current wisdom in the art of electronic mail handling. Basically, the view has generally been that "once the message is submitted to the Internet, it cannot be directly altered, canceled, or retracted by the originating program" (U.S. Pat. No. 5,870,548, col. 1, lines 37–39). The solution proposed in U.S. Pat. No. 5,870,548 is simply to send a follow-up "action message" to the recipient, asking for cancellation. The problem is that by the action message has been sent, the original message might have been copied or forwarded and therefore out of control of the original recipient, even if the recipient were to cooperate and cancel the message.

Even if cancellation of a message sent by the system of U.S. Pat. No. 5,870,548 could be assured, the system described therein does not take into account the possibility that the message might already have been forwarded by the time the cancellation request was sent to the original recipient. Furthermore, while it might be possible to prevent forwarding, and thereby help ensure cancellation, there are numerous reasons why a sender might wish to permit forwarding of a message and yet have all incarnations of the electronic mail message, rather than just the original incarnation, expire at a particular date or time. For example, the message could contain proprietary data for use by vendors, preliminary test results or draft research papers, or confidential work product to be shown to groups of clients.

In cases where forwarding of the message must be permitted, the ability not only to request cancellation by the original recipient, but also to track subsequent recipients of forwarded messages would be required in order for the system of U.S. Pat. No. 5,870,518 to ensure execution of a cancellation request by the subsequent recipients, which is impossible using existing electronic mail systems designed to transmit electronic mail over an open network.

(v) Distribution of Viewer Applets

An important feature of the present invention concerns distribution of the viewer applet that enables or implements destruction of an e-mail message at a predetermined date, time, or event. The system and method of the invention permits the originator to address the message to any desired recipient equipped to receive electronic mail, whether or not the recipient is in possession of the viewer applet. This is accomplished either by first notifying the recipient that an encrypted message has been received and then sending the viewer applet to recipient upon request, or by attaching the viewer applet to the message and notifying the recipient so that the message can be immediately installed by the user, or even by causing the viewer applet to be installed automatically upon opening of the electronic mail in a manner analogous to a benevolent electronic mail virus.

U.S. Pat. No. 5,877,755 discloses a somewhat similar arrangement in the context of an interactive broadband multimedia system. In its broadest form, the system of U.S. Pat. No. 5,877,755 provides for transmission to a customer of the executable program file that permits use of the interactive system to the customer, and then having the executable program file request downloading of the multimedia data file.

The present invention extends the concept of supplying executable program files that request data or files (which is also the concept behind "push" applets that plug into a web browser) to electronic mail with dramatic results. Whereas in all prior commercial software distribution systems including the system of U.S. Pat. No. 5,877,755, potential users must be identified and persuaded to initiate contact in order to obtain the executable program files, and so forth, the system and method of the present invention can be propagated primarily by the users themselves without the need for advertisements, central mailing lists, and so forth. Each time a user of the system sends an electronic mail message to a non-user and the non-user chooses to read the message, the non-user becomes a participant in the system. From a marketing and distribution standpoint, this aspect of the present invention represents an entirely new paradigm.

(vi) Summary of Differences Between Concept Disclosed in Parent Application and Prior Art While a number of advantages of controlling of the lifespan of electronic mail messages as described in the parent application should be immediately apparent to those skilled in the art, none of the prior systems discussed above is intended to provide such control, nor are they suitable for use in providing such control. The system described in the VDE patents, i.e., U.S. Pat. Nos. 5,892,900, 5,910,987, 5,915,019, and 5,917,912, provides a potential general framework by which electronic mail messages could be limited, but the requirement for new data structures, hardware, and programming paradigms makes it unsuitable for practical application to an electronic mail system. In contrast, although the system and method of the present invention are not limited to any particular electronic mail protocol, they nevertheless are especially suitable for implementation using existing electronic mail protocols, without requiring new data structures, hardware, or other security features. Furthermore, while the remaining patents discussed above generally provide for sender control in the specific context of electronic mail processing or handling, they do not offer (and do not need to offer) a level of control sufficient to ensure that the electronic mail message will in fact be expunged at a desired date or time, or upon the occurrence of a preselected event, and thus are also unsuitable for implementing the invention. Finally, unlike centralized digital file distribution systems such as the one disclosed in U.S. Pat. No. 5,877,755, the pre-distribution or simultaneous distribution of the viewer applet with the electronic mail message, which enables the message can be read by any electronic mail user, permits the "infrastructure" necessary to implement the system to be self-propagating and thereby create what is effectively not only a "virtual distribution environment," but a revolution in distribution and marketing that has the potential to do for software, or at least electronic mail software, what Henry Ford did for automobiles or Ray Kroc for hamburgers.

(vii) Background of Improvements Described in the Present CIP Application

The first improvement to the concept described in the parent application relates to ease-of-use of the sender's electronic mail program. As is described in detail below, the electronic mail controls described in the parent application can be implemented as an applications level electronic mail program with its own user interface. Despite the fact that such a program can be made to resemble, subject to any legal restrictions, any popular electronic mail program with any desired additional usability enhancements, it would also be desirable if the lifespan and handling restrictions could be implemented without the need for a separate applications level electronic mail program, i.e., if the invention could be implemented within the sender's existing electronic mail program. This would save system resources and reduce the learning curve for the sender or originator of the message, and is achieved in accordance with the preferred embodiments described below by providing an electronic mail proxy which creates a window with the desired controls following interception of a send request by the electronic mail program, and/or which modifies addresses in the existing electronic mail program's address book.

The second improvement relates to the electronic mail "wrapper," by which information concerning the sender and the date the message was sent is added to the electronic mail message. All current electronic mail protocols include such a wrapper. In many cases it is as important to control the future handling of the wrapper information and the association of the wrapper with the message, as it is to control the future handling of the message itself. By using an electronic mail server and/or cooperating viewer applet, the electronic mail wrapper can be stripped or edited in any desired manner before the message is presented to the recipient, or the wrapper can be offered as an optional addition or separately from the main message.

The third improvement relates to the storage of messages on a central mail server. While it is possible for the central server to hold all electronic mail messages having lifespan or other handling limitations and until expiration, it is more efficient to store at least a portion of the message on the recipient's computer. This can be done by having the viewer applet assume complete responsibility for message handling and expiration, by having the viewer applet retrieve missing portions of the message, the message wrapper, and/or handling and encryption key information each time the message is to be viewed or handled. This can also be done by having the central server retain the keys used by the viewer applet to enable viewing or handling of the message, and transmit the keys to the viewer applet either on a session-by-session basis or on a periodic basis. Alternatively, the viewer applet can simply be required to check-in with the central server to ensure that the clock used by the viewer applet has not been tampered with or malfunctioned. The requirement that the viewer applet retrieve information or portions of the message from the central server each time the message is to be viewed or handled is necessary to ensure monitoring of each transaction involving the message, while requiring less contact between the central computer and the recipient computer is more efficient.

The final improvement, which was briefly disclosed in the parent application but is discussed in greater detail herein, has the most far reaching potential of any of the improvements described in this continuation-in-part application, and relates to a by-product of the manner in which a central mail server is used to control forwarding and handling of messages. The improvement is that, in the embodiments of the invention where a central server is involved, the central server may be used to track all persons to whom the message has been forwarded, no matter how many times the message has been forwarded. This enables the mapping of affinity groups having a common interest in way heretofore considered to be virtually impossible.

Currently, mailing lists are generated by purchasing lists from providers of related services, products, or information, and by compiling lists of persons who inquire about the services, products, or information, visitors to web sites, and even persons who live in a certain area or otherwise are demographically likely to show interest in the service or product offered by the mailer. This process of compiling mailing lists is expensive, captures numerous recipients who are not interested in the services, products, or information to which the mailing is directed, and on the other hand is likely to miss many potentially interested parties. The invention, in contrast, offers the possibility of providing mailing lists based on records of where a message has been forwarded, in effect putting to work the contacts and knowledge of the original recipients of the message to create a self-propagating mailing list limited to those most likely to be interested in the products, services, or information.

For example, the product, service, or information provider might send out an initial e-mailing to potentially interested parties assembled into a conventional mailing list. Only those recipients of this e-mailing who are most interested in the product are likely to forward the information to others, and only to those who they know are likely to be interested in the mailing. It is very likely that a provider could use and be willing to subscribe to a service that is able to track such forwarding of their message. Again, therefore, the invention provides revolutionary advances in marketing and dissemination of information, replacing the old hit-or-miss methods of compiling mailing lists by a much more focused and essentially self-propagating listing which should benefit not only the provider of products, services, and information, but also those who would be interested in the mailing as well as those whose mailboxes are full of "spam" and are not likely to be interested in the mailing.

Not only does the invention make it possible to contact the personal contacts of those who have received an e-mailing (i.e., those who follow the "word of mouth" generated by a mailing) as it is forwarded from interested parties to potentially interested parties, but the invention also enables the identification of the interested contacts of any of the selected sub-groups of recipients.

SUMMARY OF THE INVENTION

It is accordingly a first objective of the invention to provide an electronic mail system and method in which the originator or sender may control the lifespan of the message, so that the message, and all copies of the message anywhere in the world, disappear at the appropriate time.

It is a second objective of the invention to provide an electronic mail system and method in which all versions and copies of the message are caused to be erased at a time or date selected by the originator or sender using a simple electronic mail client that resembles a conventional electronic mail client or that adds the necessary controls to the originator or sender's existing electronic mail application.

It is a third objective of the invention to provide an electronic mail system and method in which all versions and copies of the message are caused to be erased at a time or date selected by the originator or sender, and which requires only a simple viewer applet that can be distributed to the recipient with the message whose lifespan is to be controlled.

It is a fourth objective of the invention to provide an electronic mail system and method in which all versions and copies of the message are caused to be erased at a time or date selected by the originator or sender, and which also provides sender control of electronic mail processing or handling functions such as forwarding, modification, or printing.

It is a fifth objective of the invention to provide an electronic mail system and method in which all versions and copies of the message are caused to be erased at a time or date selected by the originator or sender, and yet which does not require the establishment by the originator of a virtual distribution environment or network, the system and method instead being set-up either by using a centralized server to automatically distribute the necessary viewer each time a new client receives a message from the server that can only be read by the viewer, or by including the viewer with message, without the need for potential clients to take any action at all other than, optionally, an indication of desire to receive messages originated by software utilizing the principles of the invention.

It is a sixth objective of the invention to provide software for managing electronic mail that enables the originator of the message to set, at the time that he or she composes the message, a self destruct date and time for that email, such that, upon that date and time, and independent, world wide, of the number and types of computers/software that may eventually interact with the message, the number of people who may eventually receive the message, or the number of handling incidents that may eventually impact the message, the message and all of its incarnations will vanish.

It is a seventh objective of the invention to provide software for managing electronic mail that ensures selective sender control of such processing functions as printing, copying, and forwarding, and yet that is relatively simple to implement and that can be used with existing electronic mail protocols.

It is an eighth objective of the invention to provide various methods for establishing an electronic mail system as described above, and in particular for distributing origination and viewer software, in a rapid and efficient manner, so that senders will be able to utilize the controls provided by the invention with messages sent to a large number of potential recipients.

It is a ninth objective of the invention to provide electronic mail software which allows the originator of a message to use an existing electronic mail application for all conventional electronic mail functions, while still enabling the originator to selectively control the expiration date of a message and such processing functions as printing, copying, and forwarding of the message.

It is a tenth objective of the invention to provide an electronic mail system and method which enables control of which portions of the electronic mail wrapper will be deleted or transmitted to the recipient or recipients of the message.

It is an eleventh objective of the invention to provide an electronic mail system and method which tracks information concerning the usage and handling of the message by all recipients or any individual or group of recipients, including without limitation records or information concerning who received the message, who forwarded the message, who modified the message, the electronic mail addresses of all of these entities, and the dates and times of all transactions relating to forwarding and handling of the message.

It is a twelfth objective of the invention to provide records or information on the usage and handling of a message by all recipients of the message or by any defined sub-groups of recipients, and further provides for control or modification of the lifespan and/or handling limitations of messages received by members of any such sub-groups.

In accordance with the principles of several preferred embodiments of the invention, the objectives relating to sender control of the lifespan and handling of messages sent over an open network are achieved by providing an electronic mail system and method in which the viewing of the electronic mail message is possible only through a viewer programmed to execute permitted handling and/or processing functions, and which in which only encrypted versions of the electronic mail are permitted to exist. Unlike the "containers" of the virtual distribution environment described in U.S. Pat. Nos. 5,892,900, 5,910,987, 5,915,019, and 5,917,912, the electronic mail packages of the present invention can be sent through existing conventional electronic mail distribution channels over an open network such as the Internet employing standard protocols such as SMTP, and a simple user interface that can be used by any electronic mail user, without the need for enhanced or new data structures. On the other hand, unlike the electronic mail cancellation structure of U.S. Pat. No. 5,870,548, access and handling controls to the message are always retained by the originator of the message.

Thus, in its broadest form, the invention involves controlling access to the electronic mail message by permitting the message to be viewed and manipulated only by a viewer program or applet responsive to the commands set by the originator of the message. The commands may be transmitted in the form of message attributes included in a header that forms a part of the electronic mail object, and that normally includes such information as the date the message was created, the time that the message was sent, the sender, a title or name of the message, and other information about the document. Such attributes are commonly referred to as an Interchange Document Profile (IDP). It has previously been known to use space in the IDP to cause a message to be automatically forwarded or resent, or to require a persistent reply, as disclosed for example in U.S. Pat. Nos. 5,878,230 and 5,325,310, but the systems disclosed in these patents cannot be used for purposes of the present invention because they surrender control of the electronic mail to the recipient once the message has been forwarded or replied to.

Those skilled in the art will appreciate that although the invention is designed to enable the originator of a message to set a date, time, or event at which all incarnations of the message will self-destruct, the technology that causes all of the incarnations to be destroyed also permits the originator of the message to cause only some of the incarnations of the message to be destroyed. For example, the originator might wish to permit saving of copies of the message sent to his or her attorneys from the general self-destruction, or the originator might wish to extend or foreshorten the expiration date for certain recipients of the message.

There are currently three principal preferred embodiments of the invention, but the invention is not intended to be limited to any of the preferred embodiments. In a first preferred embodiment of the invention, control of expiration and access to the electronic mail message is achieved by storing the electronic mail message on a designated central electronic mail server, encrypting the message with a public key generated by viewer software at the receiving end, and transmitting the electronic mail message to the recipient whenever viewing is desired by the viewer and permitted by the originator.

In a second preferred embodiment of the invention, the encrypted electronic mail message is stored on the recipient's computer and access to the message is controlled solely by viewer software also installed on the recipient's computer. In this embodiment, session keys can still be provided by the central server before viewing of the locally stored message is permitted, either on a session-by-session basis or periodically, or the viewer software can at least be required to check-in with the central server before viewing is permitted so as to ensure that the recipient computer's clock is accurate and that the message will be expunged upon the occurrence of the selected time, date, or event.

In the third preferred embodiment of the invention, which is added by the present continuation-in-part application, control of expiration and access rights to the electronic mail message is achieved by delivering a stripped version of the message in encrypted form via the designated central mail server to the recipient's viewer software for storage on the recipient's computer, and by retaining in the central mail server the message wrapper, handling and encryption-key information, and/or portions of the message, thereby requiring the viewer applet to report back to the central server each time the message is to be viewed or handled to enable the central server to directly control and track each transaction involving the message.

In each of these preferred embodiments of the invention, the encryption system by which message access to the viewer software is limited is preferably a public key/private key cryptosystem. In the first preferred embodiment of the invention, the public/private key pairs include a central server public/private key pair generated by the central server and a viewer public/private key pair generated by the viewer applet, either once or each time a message is to be read, the public key of the central server being used to encrypt the message for transmission from the sender to the central server, and the viewer applet's public key being transmitted from the viewer applet back to the central server for use in encrypting transmissions from the central server to the viewer applet. In the second preferred embodiment of the invention, the viewer applet's public key is preferably sent back to the original sender for use in encrypting the transmission. In addition, it is possible even in the first and third preferred embodiments to transmit the viewer applet's public key back to the sender to ensure that the message is kept private even from the central server.

In the case where a central electronic mail server is provided, distribution of the viewer applet may be accomplished by downloading the viewer applet from the server upon request from the recipient, or automatically with the electronic mail. Alternatively, the software may be transmitted directly from the originator software to a recipient as an electronic mail attachment without intervention of an electronic mail server, the attachment being self-executing upon opening by the recipient. The viewer applet preferably also includes message origination software, which may optionally be activated either freely or upon payment of a registration or subscription fee, or the message origination software may be provided as an upgrade or separate plug-in program distributed through the usual software distribution channels.

The message origination software may, in one preferred implementation, have an interface that resembles those of conventional electronic mail programs, but with the addition of buttons that permit setting of an expiration date and, optionally, other handling or processing limitations or rights, such as forwarding limitations or rights, as well as the right to print, and that cause appropriate flags to be toggled or set in the IDP or in a header portion of the electronic mail object.

Alternatively, the message origination software may take the form of a "control applet" that creates a window in response to the execution in an existing electronic mail program of the "send" command, and which queries the originator as to whether the above-mentioned lifespan or other handling limitations are desired. If the originator indicates that controls are desired, the control applet prompts the user for necessary information such as an expiration date, and proxies the message to the central mail server in the case of the first and third embodiments, or encrypts the message after an exchange of keys and sends the message directly to the recipient's computer in the case of the second embodiment. The trigger for creating the window may be an intercepted send command, in which case the control applet may include a shim positioned between the originator's existing electronic mail program and the SMTP stack.

Instead of or in addition to the inclusion of a control applet as described above, the lifespan and handling controls of the invention may be implemented by modifying the message originator's address book so that all of selected outgoing messages are automatically proxied to a central mail server for encryption, sending, and future handling of the message. Control options may be selected through a dialog box at the time the user enters recipient information, as part of the address book set-up, or as part of a separate program that permits selection of control options and automatically modifies all or selected addresses already in the address book.

In each version of the message origination or message control software, it is possible to include a message cancellation feature or "oops" button that allows immediate cancellation or deletion of a message after sending, or cancellation of a message before the designated expiration date, time, or event, by sending a cancellation message to the central server or recipient's viewer applet.

Upon the date, time, or event at which message expunging is to occur, the invention provides for triple erasing of the message by the central server, in the case of the first preferred embodiment, or by the viewer applet, in the case of the second preferred embodiment. In addition, either embodiment but particularly in the case of the second preferred embodiment, expunging of the message can be accomplished by triple erasing such encryption keys as to render its encryption impossible. If the first preferred embodiment of the invention is utilized, then triple erasing the message will ensure that the sent message is completely expunged from the face of the earth since the central server maintains the only copy of the message. On the other hand, while the second and third preferred embodiments of the invention may not necessarily prevent copies of the encrypted electronic mail object from being made, erasing of the decryption key or setting of the viewer so that it will no longer decrypt the electronic mail object ensures that the "message," as opposed to the mail object, is still effectively expunged from the face of the earth.

In addition to providing lifespan or handling limitations, the system and method of any of the above embodiments of the invention may be arranged to also enable selection of which portions of the electronic mail wrapper are to be deleted or transmitted to the recipient. When either the central server or viewer applet receives a message, it can transmit as much or as limited a record of the wrapper to the recipient as may be determined by the central server or viewer applet, allowing the central mail server to, by way of example, strip the date the message was sent or some or all of the sender data from the sent message before delivery to or viewing by the recipient.

In an especially useful extension of the concept of the first and third principal embodiments of the invention, both of which involve the use of a designated central mail server to provide encryption functions and to control future handling of messages, the central mail server can be arranged to track transactions involving a message and compile records of the transactions. If desired, the records of all transaction information about the usage and handling of the message, referred to hereinafter as the message completion space (MCS), can also be divided into subspaces, and information gathered with respect to the entire MCS or selected subspaces, such as the subspace of all recipients with a particular electronic mail address domain, the group of persons to which a particular recipient has forwarded a message (which may be referred to as an "affinity group" for that recipient), the group of recipients who have handled a message in a particular way, the group of recipients who have received an nth level forward, and so forth. In addition, not only can information related to the subspaces be obtained, but control of the messages, including control of message lifespan, handling, and of the message wrapper, can then be directed to versions of the message received by recipients in a particular subspace.

Finally, to protect the privacy of system users, the recipient of a message may be given the opportunity to opt-out of the information gathering process, or be required to opt-in before being included in a tracked affinity group. The latter option is especially advantageous because it ensures that any members identified with an affinity group will already have affirmatively indicated their willingness to be identified with the group.

BRIEF DESCRIPTION OF THE DRAWINGS

FIG. 13 is a flowchart showing the manner in which the electronic mail user interface of FIG. 12 is implemented.

FIG. 15 is a flowchart illustrating an embodiment of the invention in which information from the message wrapper is deleted or transmitted with the message.

DETAILED DESCRIPTION OF THE PREFERRED EMBODIMENTS

Figure 1:
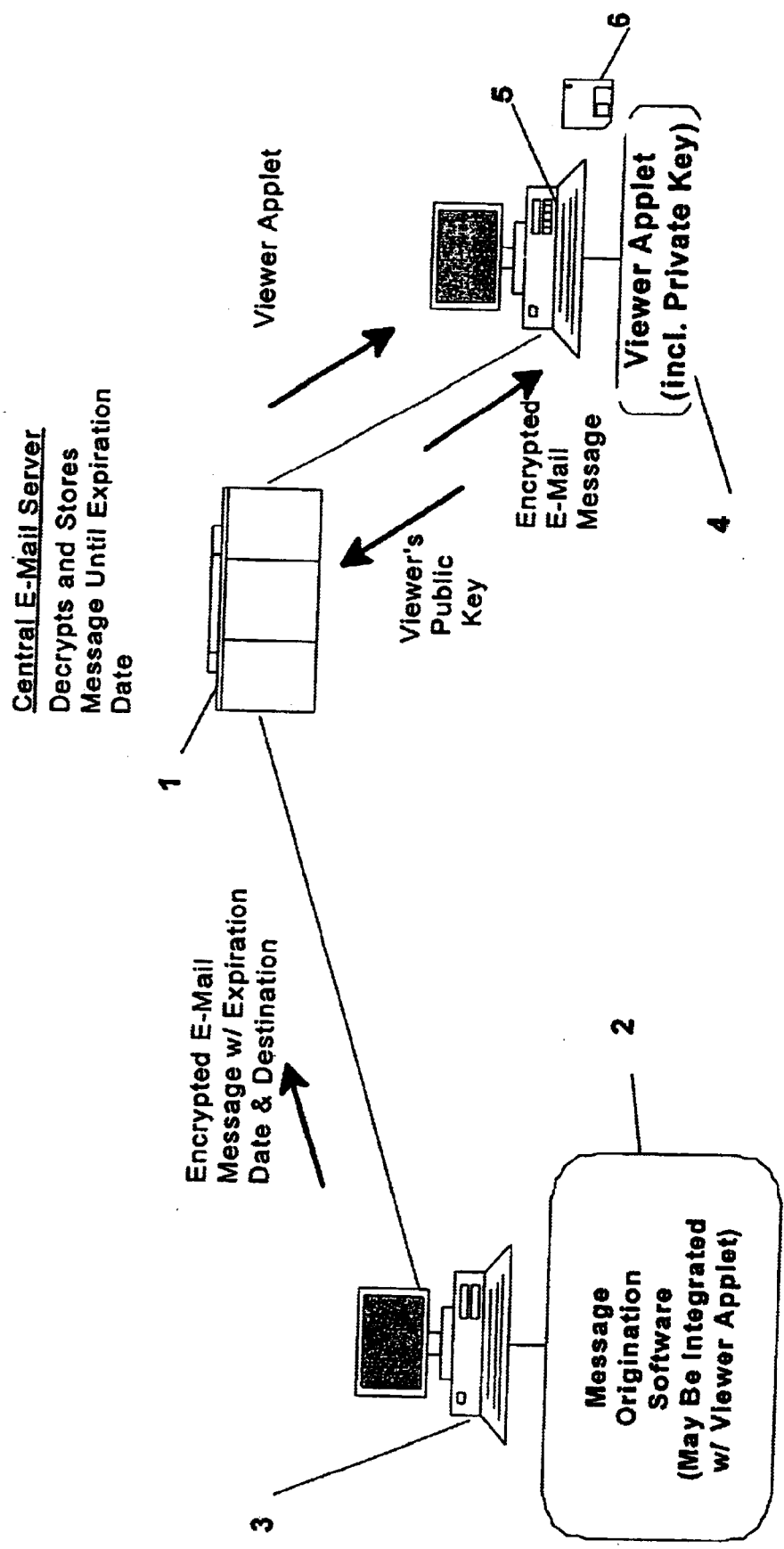
FIG. 1 is a schematic view of an electronic mail system constructed in accordance with the principles of a preferred embodiment of the invention.

As illustrated in FIG. 1, a system constructed in accordance with the principles of a first preferred embodiment of the invention includes an electronic mail server 1, message origination software 2 resident on a sender's computer 3, and a viewer applet 4, which may already be installed in the recipient's computer 5 or supplied by server 1 during delivery of a message. Although illustrated as discrete entities in FIG. 1, the message origination software 2 and viewer applet 4 are preferably integrated into a single program or applet, as will be explained in more detail below.

The basic concept underlying this embodiment of the invention is to control viewing and handling of the electronic mail message by retaining the message on the electronic mail server I and requiring the recipient to view the message using the viewer applet 4, which permits only the functions indicated by the originator of the message. Use of the viewer to view the message is ensured by encrypting the message and transmitting the message to the viewer applet, with only the viewer applet having the ability to decrypt the message, and the viewer applet retaining only transient storage of the message. Since the message permanently exists only on server 1, erasure of the message from storage associated with the server expunges the message from existence. Even if copying of the message were permitted, for example for the purpose of placing the message in different folders or storage areas, all copies of the message would still reside in the server's secure storage area and therefore be subject to deletion at the time, date, or event preset by the message originator. Conversely, control of the message in this manner also enables the originator to designate different expiration dates for different recipients, or even to except certain recipients from the expiration date or other controls.

Figure 2:
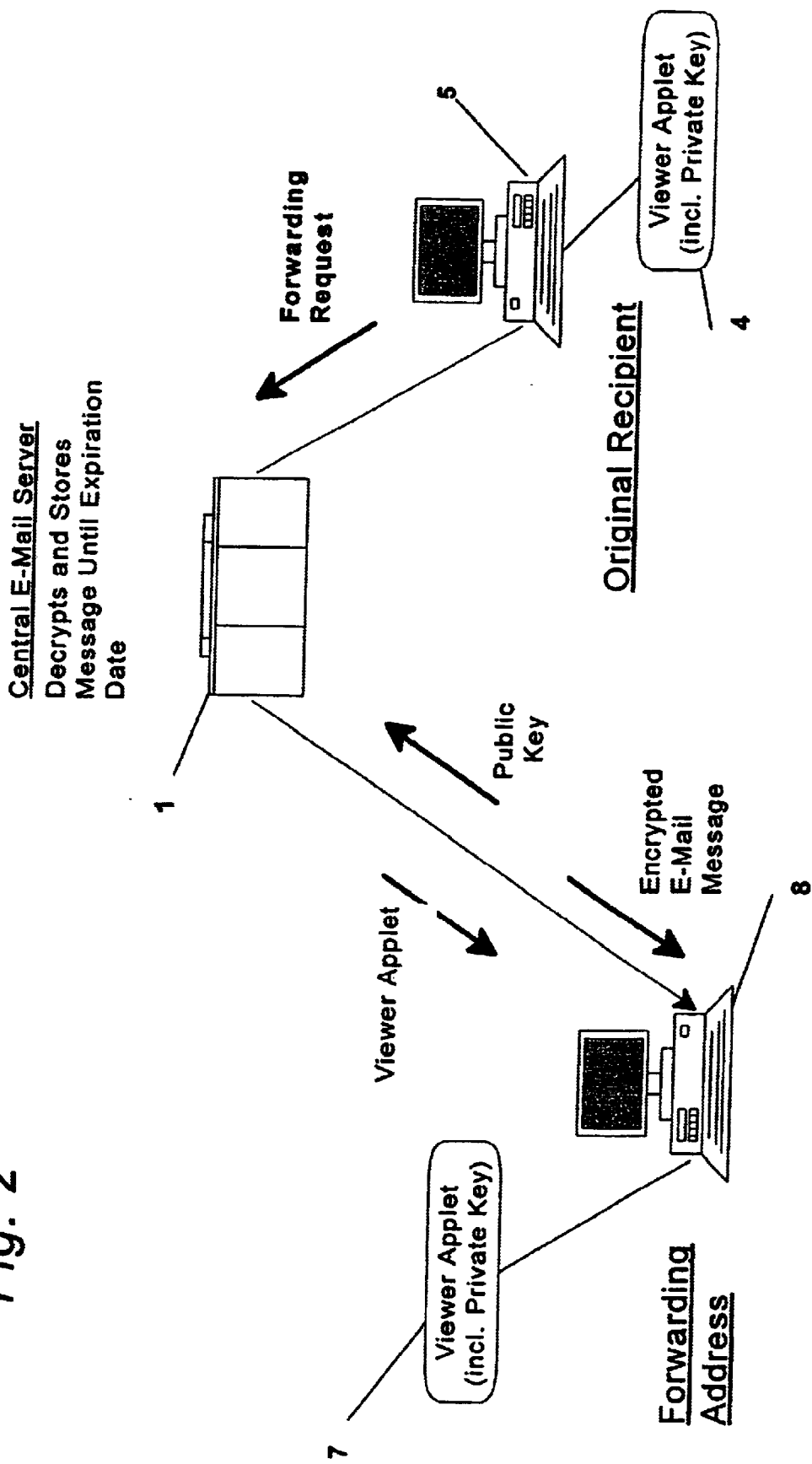
FIG. 2 is a schematic view showing the manner in which a message is forwarded in the electronic mail system of FIG. 1.

As illustrated in FIG. 2, this set-up enables forwarding of the message without surrendering control of the message. A forwarding request from the original recipient is handled in exactly the same manner as a request by the recipient to view the original message, i.e., by notification sent by the central server to the intended recipient of the forwarded message that an electronic mail message has been received, by downloading a viewer applet as necessary, and then by transmitting the message to the installed viewer applet 7 on the forwarded message recipient's computer 8. Although illustrated as a direct connection between the server 1 and the computer 8, those skilled in the art will appreciate that server 1 and computer 8 could be connected to different nodes of the Internet, and that forwarding of the message may involve a second, local central electronic mail server (not shown).

Because the message is stored only at the central server 1, sender control of additional processing or handling functions can easily be provided by designating portions of the original message header as control bits or flags, which are read by the server or directly forwarded to the viewer applet on the recipients computer, and which selectively disable functions provided by the viewer applet 4. For example, forwarding of the message can easily be prevented by the central server 1, without involving the viewer applet 4, by simply having the central server refuse forwarding requests. On the other hand, prevention of copying or printing of the message would normally be carried out by disabling (or conversely by not enabling) copy or print functions of the viewer applet 4.

The electronic mail server 1 may be configured to receive and process electronic mail messages using any electronic mail protocol and transmitted over any suitable medium, including media involving such technologies as biochemical or molecular transmission and/or storage that have yet to be implemented. For purposes of the present description, the electronic mail protocol will be assumed to be SMTP, but the invention is not intended to be limited to any particular transfer protocol. In addition, it will be appreciated that any message sent from the message origination software 2 to the server 1 may be routed through a number of different servers (not shown) after initial contact with a local gateway server in the manner of a standard electronic mail message. Under SMTP, the origination software is only responsible for supplying the destination address to the local server, which relays the destination address to other servers using, for example, the DNS registration system of the Internet, and ultimately to the destination, which in this embodiment is the address of server 1. Under certain electronic mail protocols, it is possible to include the server address under routing information, although the SMTP protocol discourages such routing, and thus in the preferred embodiment of the invention the address of the recipient is inserted by the message origination software into the message header rather than as a destination (RCPT) command.

By way of illustration, if the recipient is already a subscriber to the system or has a viewer applet installed, the recipient's address will be in the form of <recipient>@<cs>.com, where cs is the domain name of the central server and <recipient> is an address that has been assigned to the recipient. If the recipient does not have an electronic mail address assigned by the system, then the originator software must encode part or all of the original address in the message header following the DATA command, and substitutes an address in the form < . . . >.<cs>.com, where < . . . > can be any local designator convenient for the central server, such as an indicator that the recipient is not a subscriber, or an account number of the originator. Upon receipt of the electronic mail message, the central server reads the recipient's actual address from the header and uses that address to establish initial communications with the recipient.

Also in the message header, as mentioned above, are fields for including control information used to enable or disable electronic mail processing or handling functions, such as printing, copying, or forwarding, as well as a field that sets the expiration date, time, or event (such as expiration upon reading). These fields can be in the form of flags that are toggled on or off by the message origination software, or may include more detailed control information, such as provision for enabling forwarding upon entry of a password or fulfilling of designated conditions, and as indicated above may also be in the form of IDPs, SMTP service extensions, or any other portion of the electronic mail object that can be parsed by the central server and that will not affect the basic routing of the message to the central server 1.

Although the communications link from the origination software to the server is a standard electronic mail communications channel, the transmission of the message from the central server I to the recipient's computer 5 may optionally be carried out through a channel established by the recipient's Internet browser, i.e., through a standard http (hypertext transfer protocol) connection, rather than through an SMTP or IMAP connection, allowing delivery of electronic mail to HTTP-based electronic mail software or to devices other than a personal computer, such as a WebTV™ or similar appliance. The viewer applet may thus be implemented as a Internet browser plug-in utilizing a technology such as Active-X, an executable program that works within the Internet browser in the manner, for example, of Adobe Acrobat™, a Java applet with native file level BIOS access, or an extension to an operating system such as Microsoft Windows NT™ or LINUX If a viewer applet 4 has not already been installed on the recipient's computer, it may be delivered as a self executing attachment to a standard electronic mail notice from the server 1. The notice indicates that sender-controlled electronic mail has been received and that, to view the message, the sender must open the attachment and follow the directions provided by the applet installation program. In addition, the viewer applet may be saved to a magnetic disk or other portable storage medium 6 so that e-mail can be viewed from remote locations, or the viewer applet may be protected by hardware such as a smartcard.

In order to encrypt the message in a form that can only be read by the viewer applet, some sort of key exchange between the viewer applet 4 and the server 1 is necessary. In the preferred embodiment of the invention, this is accomplished by having the viewer applet generate a private/public key pair and sending the public key to the server so that the server can encrypt the message by the public key of the recipient's viewer applet, the encrypted message therefore being readable only by the viewer using the viewer's private key. A new public private key pair could be generated for each session, or the public key of the recipient could be stored by the server for retrieval each time a message addressed to the recipient is received. While generation of the public keys can be achieved by a variety of known methods, one possible method is to generate the public key based on the variation of times between a user's key strokes, which is known to be a true random number, thereby ensuring the uniqueness of encryption keys for each applet.

Alternatively, instead of using a public key generated by the recipient to protect the message, those skilled in the art will appreciate that it is also possible to include the necessary key in the applet itself prior to downloading, in which case the decryption key could be a shared secret key, or to mutually generate a session key during a handshaking procedure in which exchange of portions of the session key is carried out using a secret key that has previously been transferred to the viewer applet. Other encryption or message protection methods such as chaffing could also be used and the invention is not intended to be limited to any particular encryption method.

As indicated above, delivery of the message from the message origination software 2 to the server 1 is preferably via a standard electronic mail connection. Even though encryption of the message by message origination software 2 will not normally affect handling of the message by the recipient, since the message will be encrypted by the central server 1 before delivery to the recipient, the message is nevertheless preferably also encrypted before sending to the central electronic mail server 1 to ensure that the message will not be intercepted and copied during transit. Again, the invention is not intended to be limited to a particular encryption method, although in the preferred embodiment public key encryption is used.

When encryption is used to protect the message during transit to the central server 1, the public key used to encrypt the original message can either be the public key of the server, in which case the message must be decrypted and re-encrypted by the server prior to deliver, or the public key used to decrypt the message can be the public key of the recipient, in which case the electronic mail server would not need to decrypt the message before sending it to the recipient's viewer applet. Of course, the original message can be initially encrypted in a form that cannot be decrypted by the server, and then further encrypted by the public key of the server, so that even if the server decrypts and re-encrypts the initially encrypted message, it will still be unreadable by anyone but the intended recipient.

Figure 3:
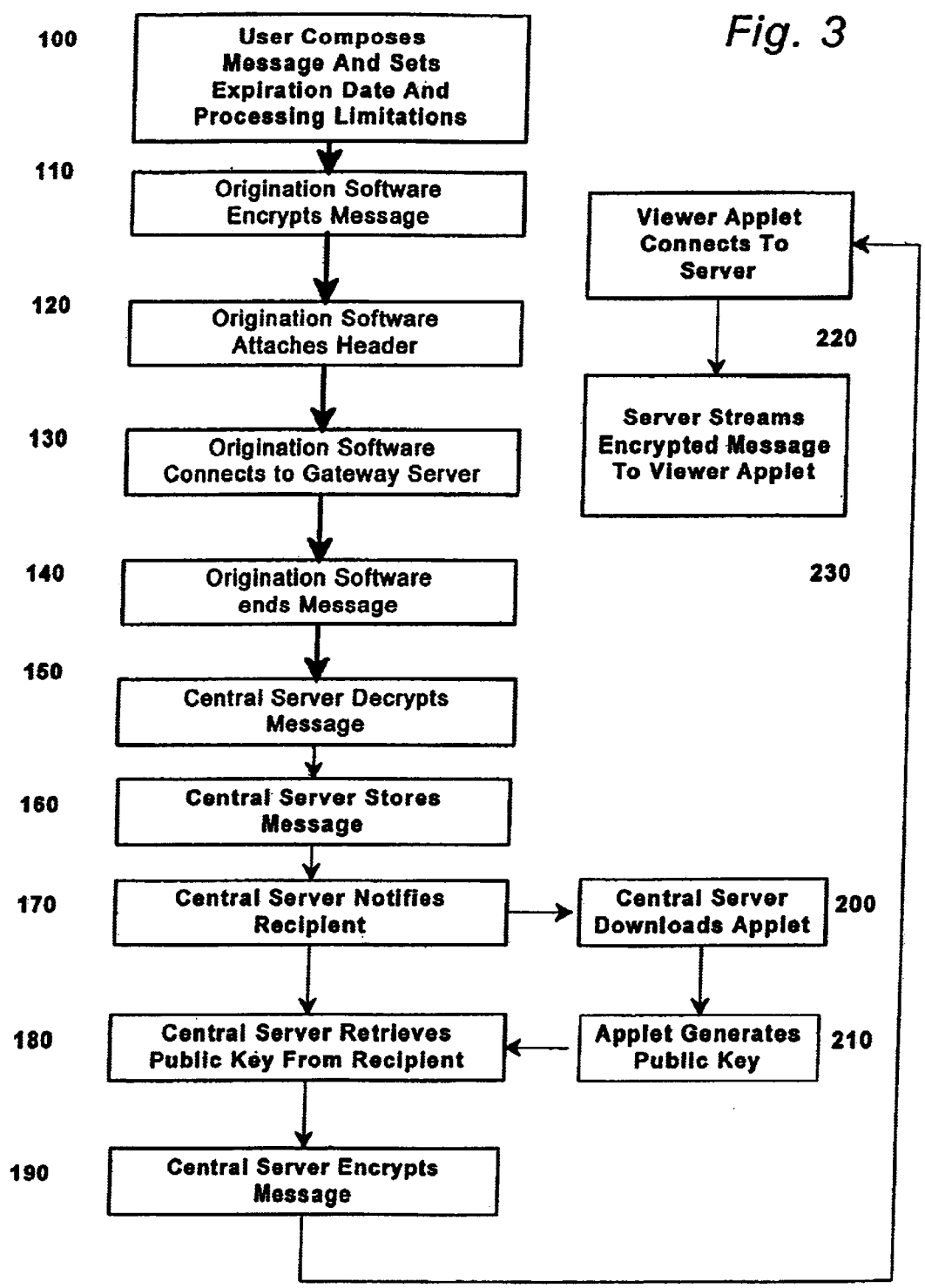
FIG. 3 is a flowchart of a method corresponding to the electronic mail system of FIG. 1.

As shown in FIG. 3, the method of the preferred system embodiment illustrated in FIG. 1 begins with the composition of an electronic mail message by the originator of the message, and designation of an expiration date and other handling or processing limitations (step 100). The originator software then encrypts the message using the public key of the central mail server or possibly the public key of the recipient (step 110), and creates an electronic mail object by attaching a header containing routing information, the expiration date, and other handling or processing instructions using an appropriate format (step 120).

In the case of the SMTP transmission, the originator software opens a connection to a gateway server (step 130). After the gateway server responds with a welcoming message, the message origination software sends a MAIL command which includes the sender identifier and, optionally a service extension or mail parameters, followed by an RCPT command, which identifies the recipient as the central mail server (step 140). In order to simplify use of the message origination software, it is preferable that the user of the message origination software be able to enter the recipient's normal electronic mail address even if the domain name is not the same as that of the central server, with the message origination software being arranged to substitute the central server's address in the RCPT command and to insert the ultimate recipient's address in the header. In this respect, the central server functions as a proxy server whose operation is transparent to the sender.

Upon delivery of the encrypted message, if the message has been encrypted with the recipient's public key, then it is not necessary for the server to decrypt the message, but if the message has been encrypted by the message origination software 2 with the server's public key, the central server decrypts and parses the message for control information (step 150). In either case, the server then stores the message (step 160) and notifies the intended recipient that a message has been received (step 170).

If the message has no expiration date or other access or processing limitations, the message may optionally be sent directly to the subscriber in the manner of a conventional electronic mail message, but if the message has an expiration date and other access or processing limitations, and a viewer has been installed, the public key of the recipient is retrieved (step 180) and the message is encrypted by the public key generated by the recipient's viewer applet 4 (step 190). If a viewer has not already been installed, then the additional steps of installing the viewer applet on the recipient's computer (step 200) and generating a public key (step 210) must be performed.

When viewing of the message is desired by the recipient and the message has not expired, the viewer applet 4 establishes a connection to the central server 1 (step 220) and the central server 1 transmits the encrypted message to the viewer (step 230), subject to any use or handling limitations.

Finally, upon occurrence of an originator preselected event (such as reading of the message or failure of a recipient to check-in with a security agency) and provide proper identification, the message is deleted from storage (step 240), thus completing the method of the first preferred embodiment of the invention. Depending on the operating system used by the server, deletion might require special procedures such as triple erasure in the case of a Windows 95™ or Windows NT™ operating system and, in addition, the system of the preferred embodiment can provide for notification of the message originator upon successful expiration of the message together with, or in addition to, a report on the life history of the message such as a description of who received the message, who opened it, to whom it was forwarded, who modified it, who printed it out, and the dates and times when reception, forwarding, modification, printing and so forth occurred.

The user interfaces for the message origination software and viewer applet may be designed to be similar to that of a conventional electronic mail program. Preferably, the viewer and origination software are combined into a single program, although certain features of the message origination software, such as the expiration date and ability to insert processing or handling controls, may be kept inactive upon initial download until the software is registered or a subscription fee is paid, or activated only for a trial period. This combined software package can include all of the functionality of a conventional electronic mail or messaging program, such as Microsoft Outlook Express™, Corel Central™, Netscape Messenger™, or Lotus Notes™, including the ability to create and receive non-encrypted electronic mail messages.

Figure 4:
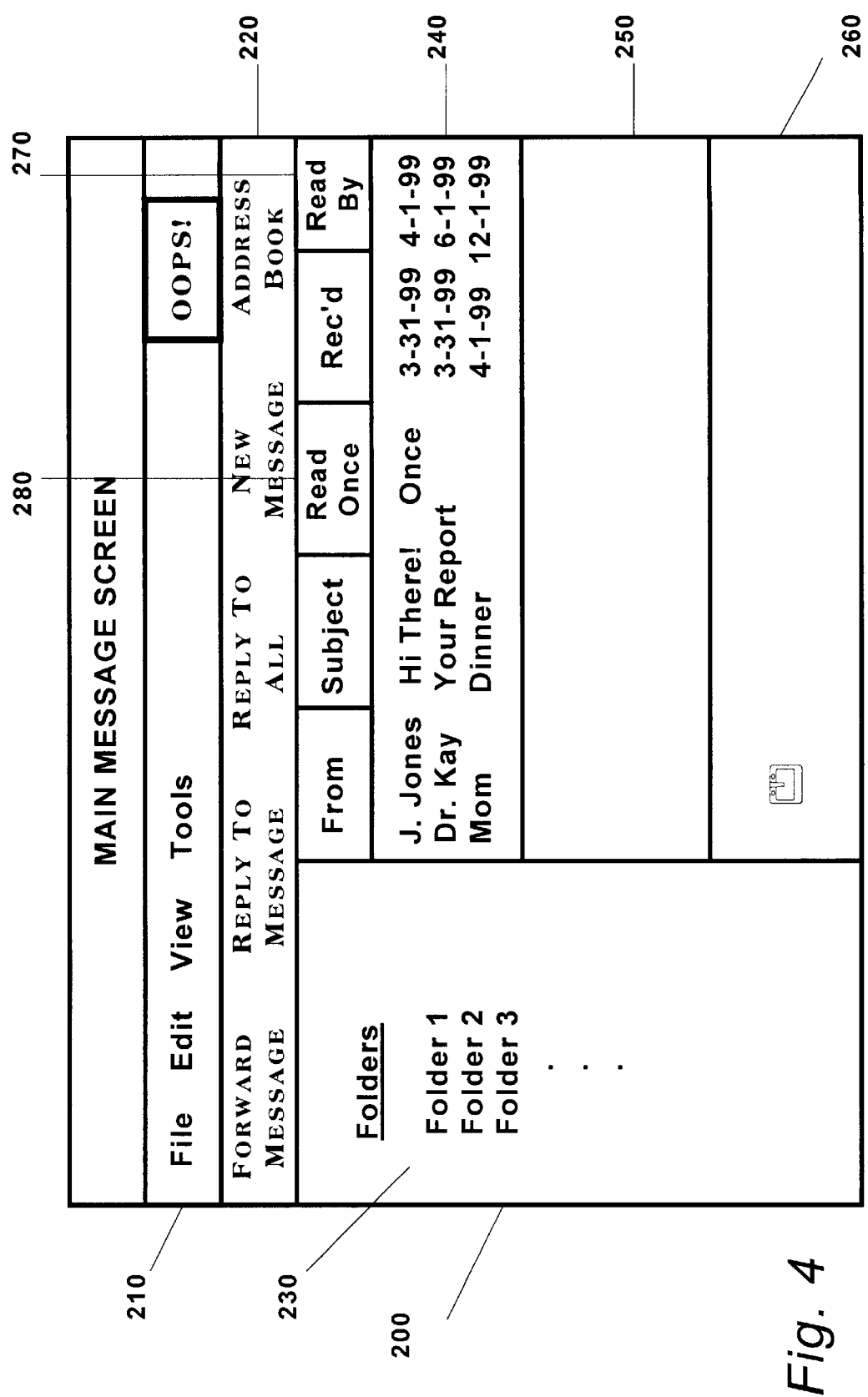
FIG. 4 shows a main message screen for software implementing the method of FIG. 3.

In particular, as illustrated in FIG. 4, the combined viewer and origination software user interface may include a main message screen 200, menus 210, and/or function bars 220 to manage or enable use of such features as electronic mail receiving, filing, editing, and forwarding, as well as a folder display window 230, a file listing window 240, a file viewing window, and an attachments window 260, all of which resemble those of the conventional electronic mail client. According to the principles of the invention, when a message is received with a flag in the header indicating that a function, such as the forwarding function, is disabled, the corresponding button or menu item is also disabled and the display screen is modified to indicate in conventional fashion that the button or menu item is disabled. In addition, the main message screen may provide an indication 270 of the expiration date of the received message, or an indication 280 of other limitations, such as a read once limitation.

Those skilled in the art will appreciate that the message and filing functions provided on the main message screen actually involve manipulation of messages that exist, in the preferred embodiment of the invention, only on the central server 1. In this respect, the system of this preferred embodiment works in the same manner as an IMAP mail server, with the addition of expiration date and other use limitations. However, in the case of new message creation, or if the content of a received message is editable, text editing functions can be performed locally.

Figure 5:
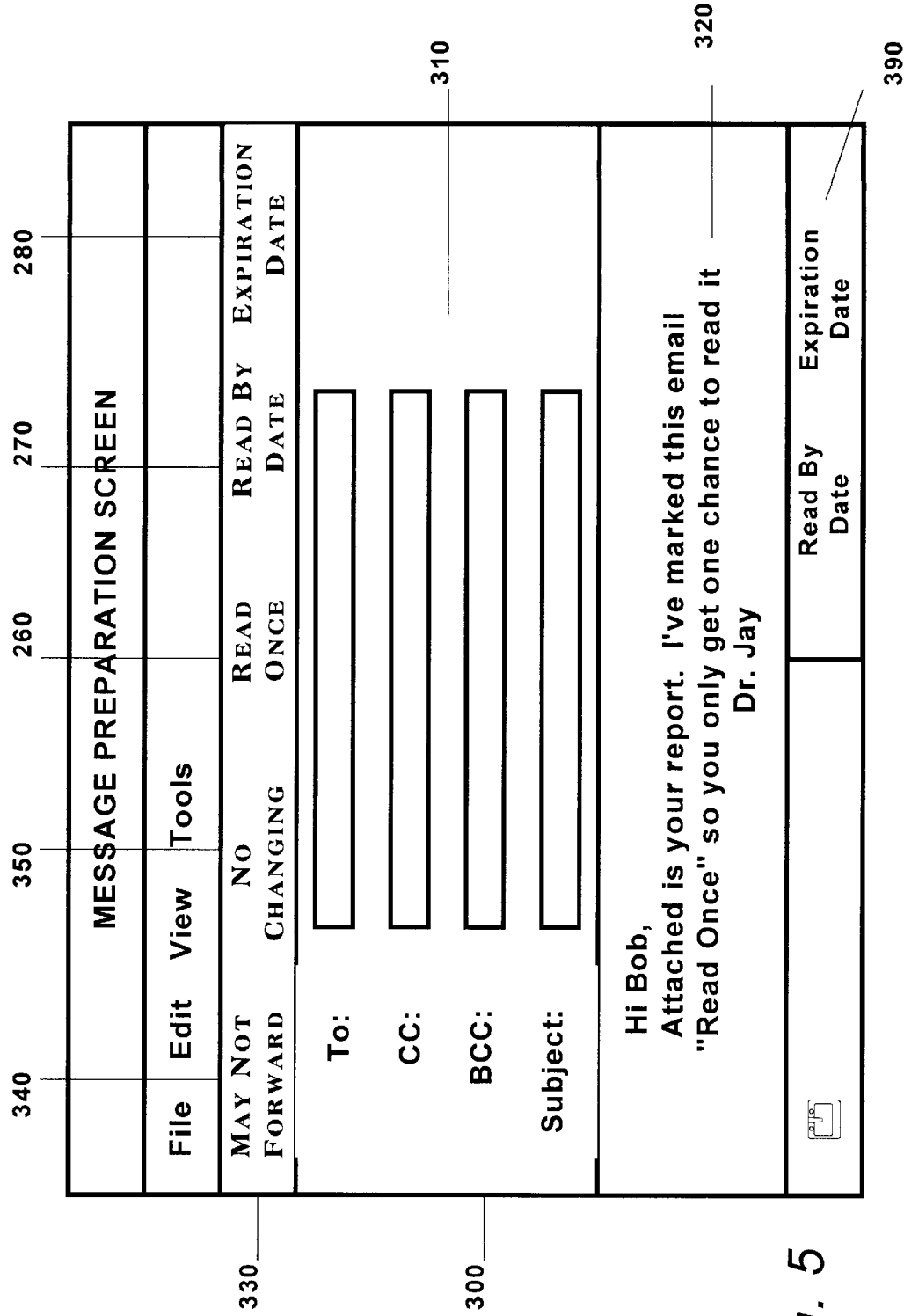
FIG. 5 shows a message preparation screen for software implementing the method of FIG. 3.

An example of a message preparation or creation screen 300 is illustrated in FIG. 5. This screen is presented upon selection of one of the "Reply," "Forward," or "New" message buttons of screen 200, and includes conventional boxes 310,320 for respectively entering addresses and text. In addition, the message creation screen 300 includes buttons 320 that enable the user to cause the message origination software to insert into the header flags to activate use of processing limitations. Buttons 330 include, by way of example, a button 340 that limits forwarding, a button 350 that prevents editing by the recipient, a button 360 that permits the message to be read once, a read-by date button 370, and an expiration date button 380. When any of the latter three buttons is pressed, the message originator is prompted for a date, which is then inserted into the message header and may appear in a confirmation window 390. The read-by date differs from the expiration date in that the message will immediately be expunged after reading, or expunged on the desired date even if the message has not been read, whereas the expiration date button permits the message to be read as many times as desired before the expiration date.

Figure 12:
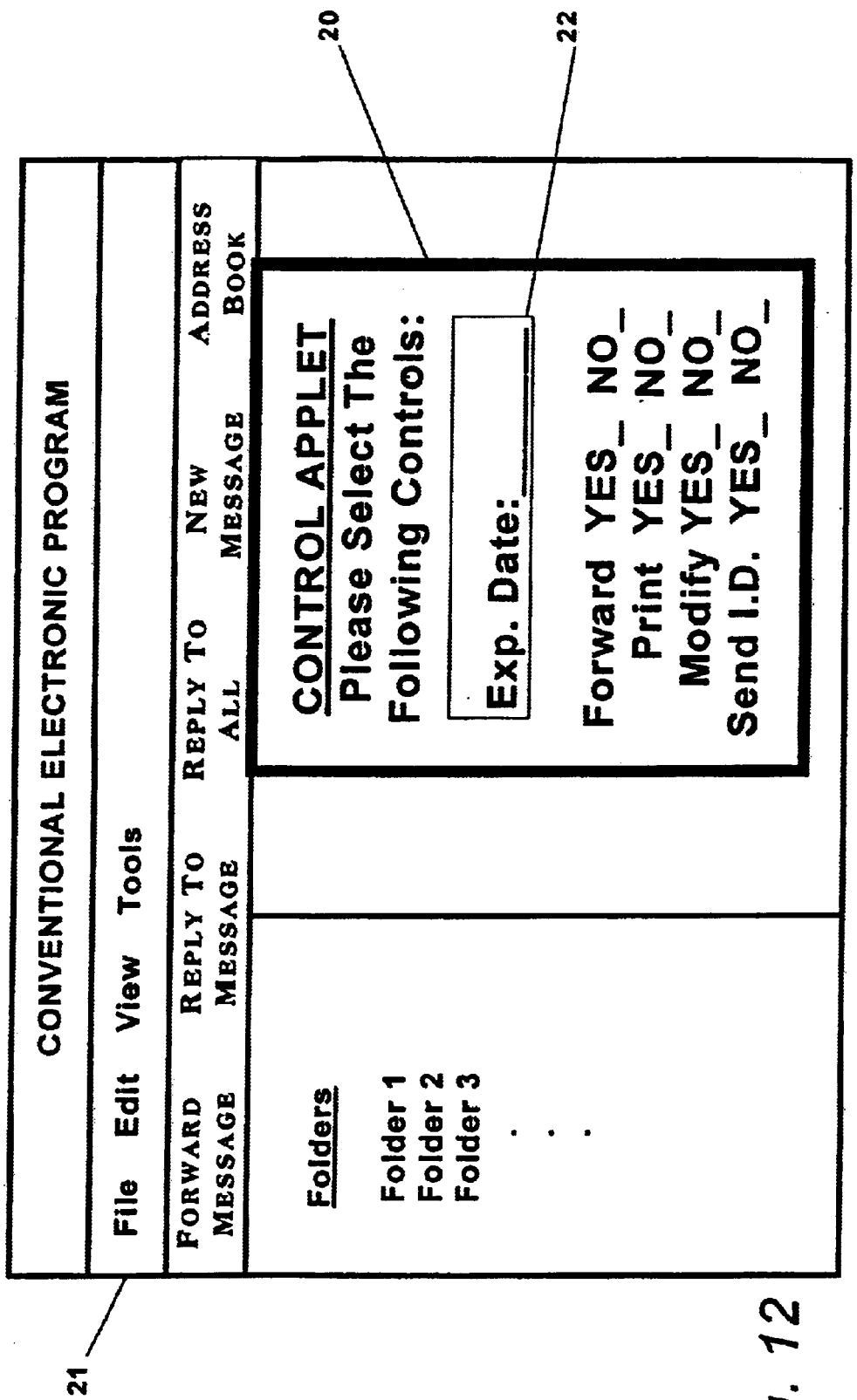
FIG. 12 shows an alternative version of the electronic mail user interface illustrated in FIGS. 4 and 5.

In an alternative to the software illustrated in FIGS. 4 and 5, control of the lifespan and handling of an electronic mail message may be achieved without replacing the message originator's existing electronic mail program. Instead, in this variation of the user interface illustrated in FIGS. 4 and 5, as illustrated in FIG. 12, a control applet is arranged to open a window 20 that presents the message originator with control options after the message has been created and sent using the message originator's existing electronic mail program 21. The control applet is in the form of software arranged to intercept the "send" command of the protocol used by the existing electronic mail program and, in response, to open window 20 which presents the message originator with the option of selecting various message life and handling controls 22. If any of the message life and handling controls are selected, the message is sent to a central mail server corresponding to the server of the first embodiment of the invention (or a server corresponding to the principal embodiment described below) for appropriate handling. If no control option is selected, the message can be forwarded directly to the recipient through conventional channels, or can still be routed through the central mail server for handling in a conventional manner.

It will be appreciated by those skilled in the art that instead of a single window that presents all of the control options, the user interface may include a main window that opens further windows depending on which, if any, control options are selected, and that the form and design of the windows may be varied in any desired manner. In addition, the control applet may be installed as part of the existing electronic mail program, or as a separate application which shares the same socket or transport driver layer and therefore is able to intercept the send command.

As illustrated in FIG. 13, the control applet of this embodiment of the invention initially runs in the background as the message originator uses existing software to create a message (step 400). Upon recognition of a send command, the message sender applet opens a window to prompt the message originator for control options (step 410), encrypts and/or modifies the electronic mail package in the manner described above (step 420), and sends the electronic mail package to the central mail server (step 430). If no control option is selected, the message may be sent through conventional channels (step 430).

Figure 14:
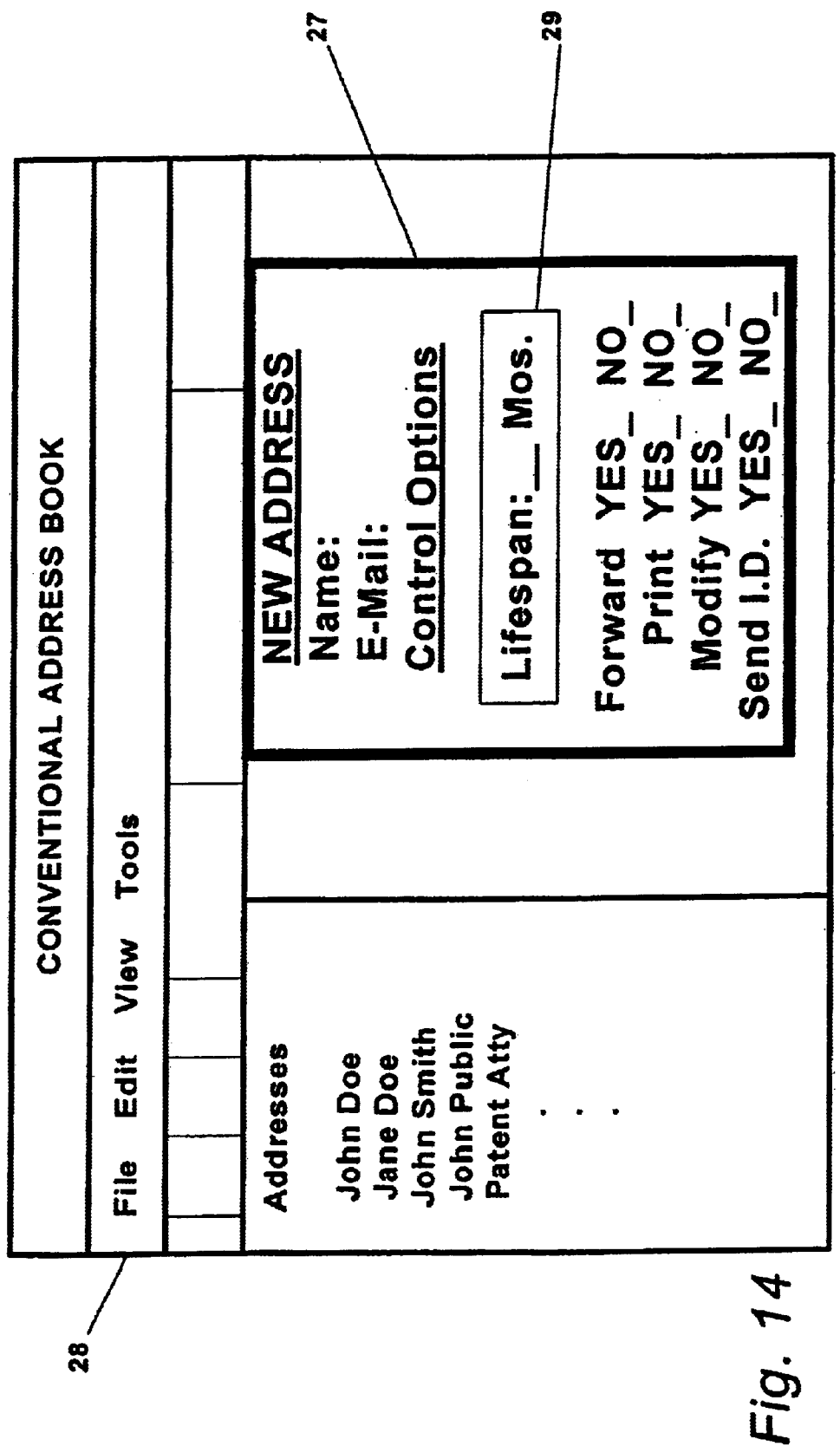
FIG. 14 is a schematic view of a further variation of the electronic mail user interface illustrated in FIGS. 4 and 5.

In the variation illustrated in FIG. 14, the dialog box 27 for entry of addresses into an electronic mail address book 28 may be modified to include message control options 29. Any addresses for which a control option is selected, and optionally other addresses, are automatically routed to the central mail server for encryption and control of future handling and expiration of the message. The control applet of this embodiment can be arranged to present a dialog box each time a new address is entered, as illustrated, or to provide the address book with a common control option dialog box which sets the control options for all messages entered in the book, or for selected messages based on predetermined criteria.

An additional feature that can be added to each of the user interfaces illustrated in FIGS. 4, 5, and 14 is an "oops" button (shown only in FIG. 4) that enables immediate cancellation of a message after the message has been sent to the central server by having the message origination software send a follow-up cancellation request. This is similar to the cancellation request described in U.S. Pat. No. 5,870,548, but with cancellation ensured through the operation of the central server as described above. To facilitate cancellation, the server could provide a short time-delay before permitting viewing of the message.

In addition to providing for control of lifespan, processing, or handling of the message by all potential recipients, the system and method illustrated in FIGS. 1–3 enables control of how information from the electronic mail wrapper, such as the identity of the sender and the time that the message was sent, is coupled to the message and presented to the recipient. For instance, the server could strip transmission time information from the wrapper and the applet could present message sender identification separately from the message itself, i.e., the recipient would be unable to simultaneously see both the message sender identification and the message. As illustrated in FIG. 15, this may be accomplished in the same manner as the other control options, i.e., by using a central mail server to append appropriate electronic mail wrapper control information before forwarding the message to designated recipients (step 500), and by having a viewer applet installed on the recipient's computer decode the selected control options, search for appropriate fields in the message wrapper, and carry out the desired wrapper controls by for example deleting various items from the wrapper, such as the identity of the sender and/or the date or time when the message was sent, in response to the control information included by the central server in the message header or IDPs as described above (step 510) before presenting the modified electronic mail package to the recipient or recipients (step 520).

Figure 6:
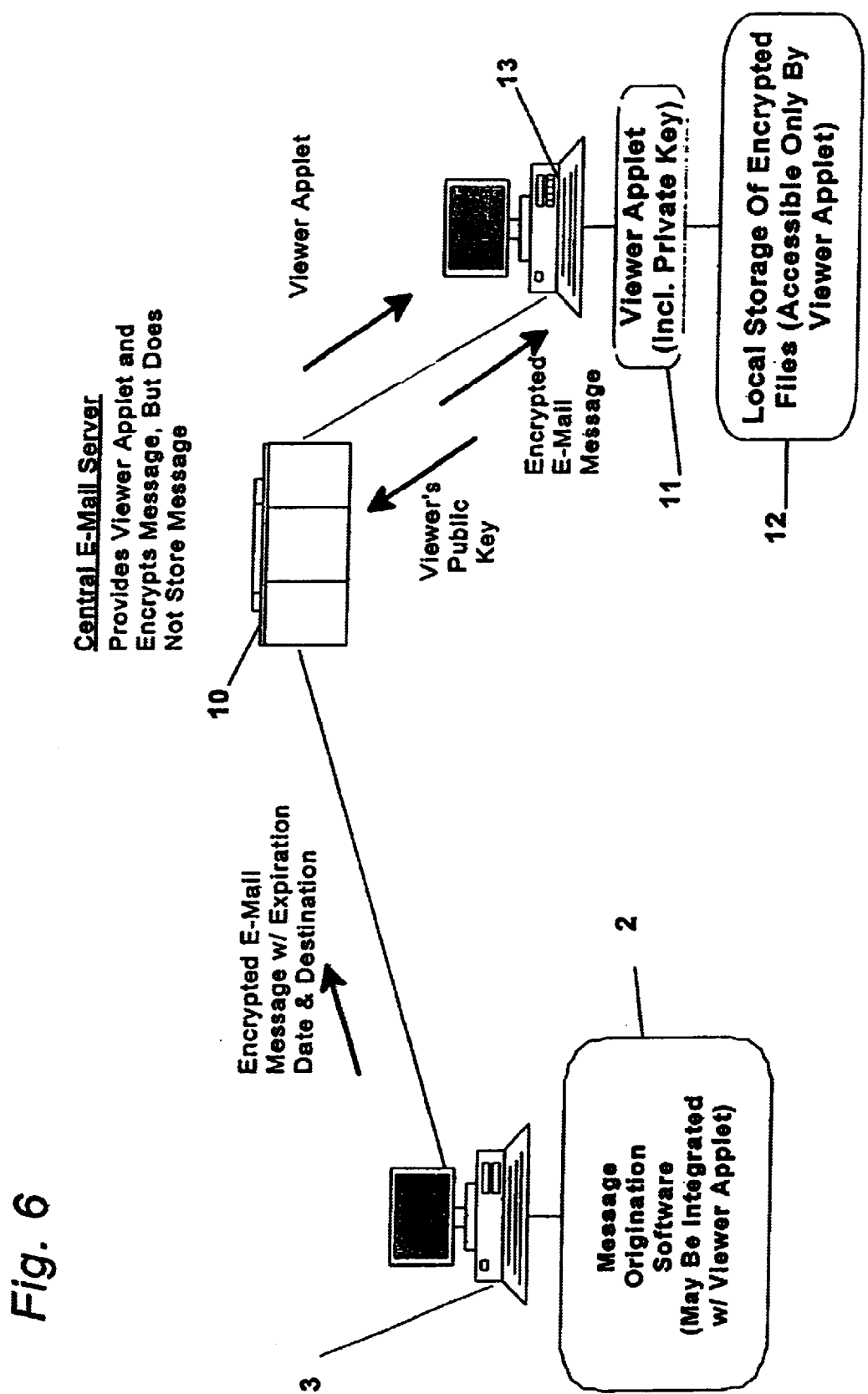
FIG. 6 is a schematic view of a variation of the electronic mail system of FIG. 1.

While the first preferred embodiment of the invention represents an especially straightforward way of limiting access and handling of electronic mail messages by storing the messages on the server and transmitting them to the viewer applet, it is in principle possible to create a local store for the files while retaining access control by storing the files in encrypted form on the recipient's computer, as illustrated in FIG. 6, leaving access to the files to the viewer, or central control can be retained through the use of session keys depending on options selected by the sender. The central computer can then be used solely for functions of auditing, billing, or tracking of message handling by recipients.

In the former case, the primary role played by the central server 10 would be to extract the recipient's address from the message header, if the recipient is not already using the domain name of the server, and to supply the viewer applet 11, which creates a local storage area 12 on the recipient's computer for encrypted files. Since the files are encrypted, viewing is effectively prevented unless the viewer is used, and thus control is still retained by the viewer program.

In the latter case, the server may retain control of access to messages by having the viewer obtain the necessary decryption keys from the server, either by obtaining a key each time viewing is desired, by having the viewer renew the session key at predetermined intervals, or simply by having the viewer applet check-ion with the central server periodically to verify that the clock used by the viewer applet has not been tampered with and/or has not malfunctioned.

Figure 7:
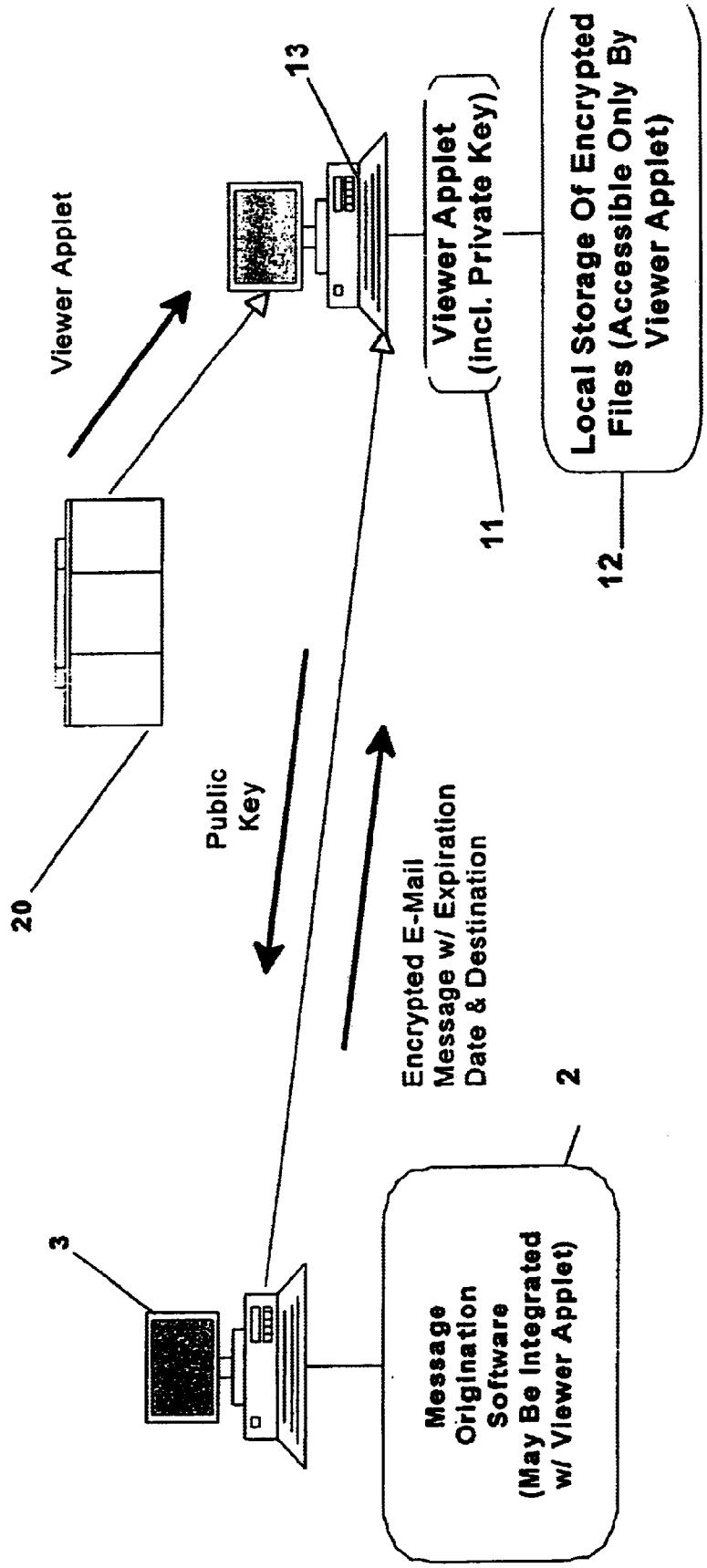
FIG. 7 is a schematic view of a further variation of the electronic mail system of FIG. 1.

In a still further variation of the first preferred embodiment of, the invention, illustrated in FIG. 7, the principle of local storage of the encrypted message is extended still further by eliminating the encryption function of the central electronic mail server 20, and instead having the message origination software 2 encrypt the message with the recipient's public key. In that case, server 20 serves only to supply the viewer applet.

Those skilled in the art will note that each of the variations shown in FIGS. 6 and 7 can use the same message origination software and viewer applet. This is because the only difference involves whether the server or the recipient is initially addressed by the message origination software, and therefore whether the server's or the recipient's public key is used for encryption.

Figure 8:
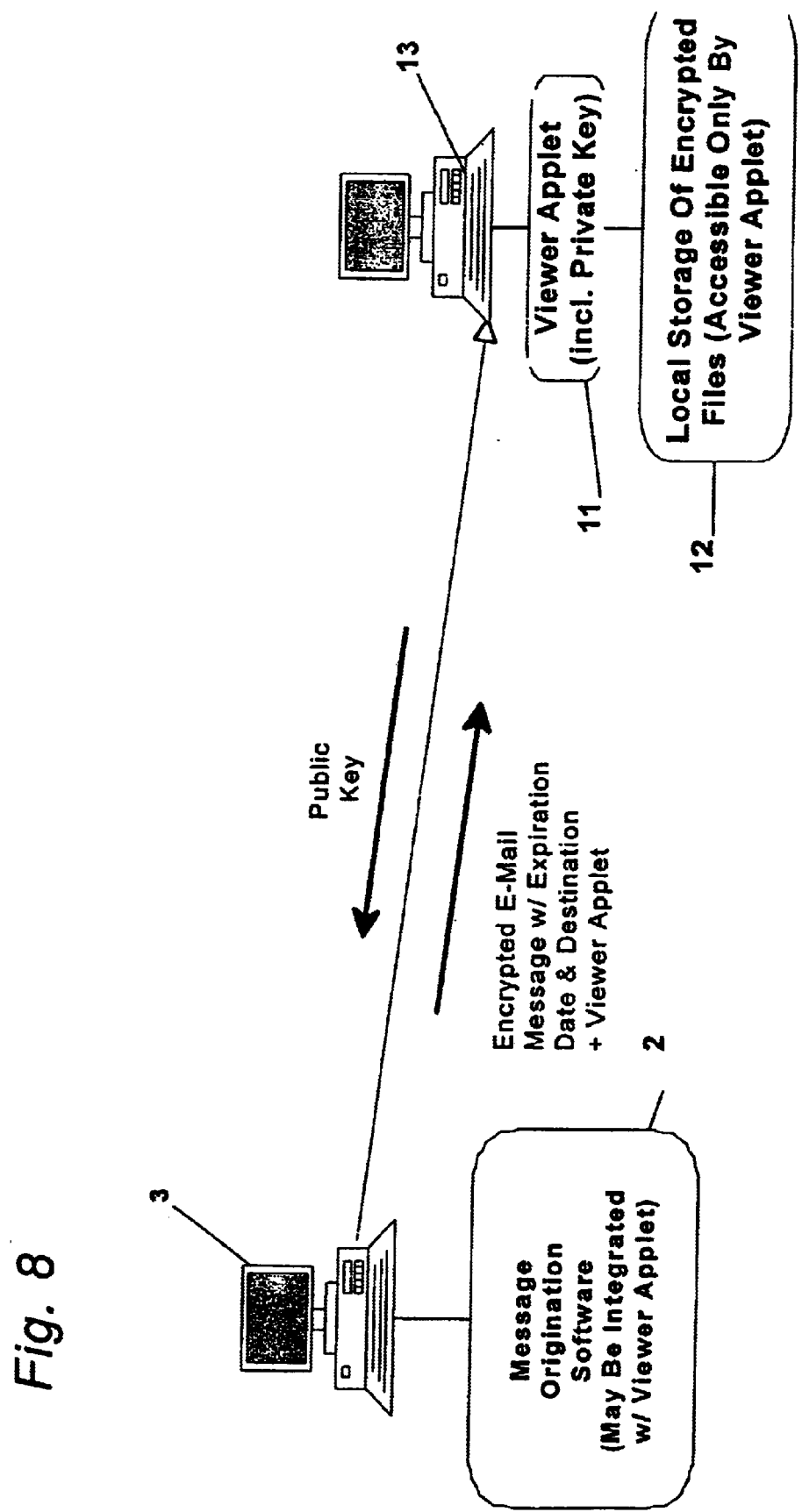
FIG. 8 is a schematic view of an electronic mail system constructed in accordance with the principles of a second preferred embodiment of the invention.

In the second preferred embodiment of the invention, as illustrated in FIG. 8, the viewer applet is itself attached to the encrypted electronic mail message, and the central server is eliminated entirely. As in the first preferred embodiment, the recipient of the message may be given the option of installing or refusing the viewer applet in order to view the message. Alternatively, however, the viewer applet can be made self-executing since there is no need to register with the server, permitting the viewer applet to be spread like a benign virus each time a recipient uses the applet to send or forward a message.

Those skilled in the art will appreciate that this decentralization of the point of control of the distribution of electronic mail may have applicability to the distribution in general of electronic information transmitted via a decentralized computer network connecting the originator with a recipient through a clearing-house (the central server of the first preferred embodiment), or even without the intervention of a clearing house (attachment of the viewer applet to the electronic mail message).

Figure 16:
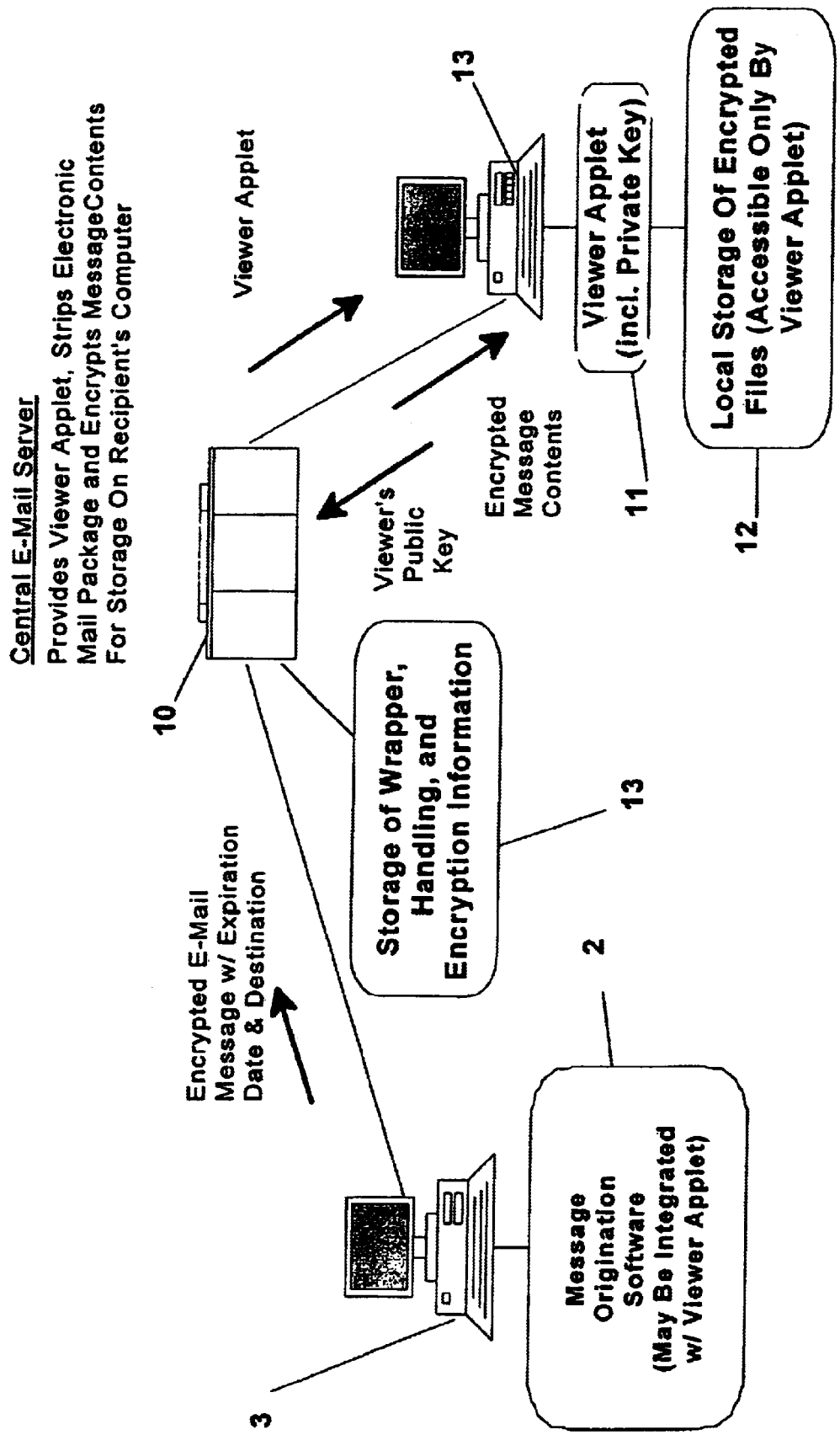
FIG. 16 is a schematic view of a third preferred embodiment of the invention in which a central mail server retains control of the message while permitting a stripped version of the message to be stored on a recipient's computer.

In a third embodiment of the invention, illustrated in FIG. 16, the central server sends portions of the encrypted message to the viewer applet in a manner similar to that described above in connection with FIG. 6, but retains sole possession of portions of the message package, such as the wrapper, handling and encryption-key information, and/or portions of the message itself and stores this information in a central database 13. Unlike the variation of the first preferred embodiment shown in FIG. 6, the viewer applet must request information from the central server each time the message is to be viewed or otherwise handled, enabling the central server to track all transactions involving the message for purposes to be explained in detail below.

In this embodiment of the invention, if the message is to be forwarded, the viewer applet can either send its portion of the encrypted message back to the central server for forwarding, or it can send the encrypted message directly to the recipient of the forwarded message, in which case the forwarded message recipient's viewer applet would need to request provision of the central server's portion of the message or other information necessary for viewing the message.

Figure 9:
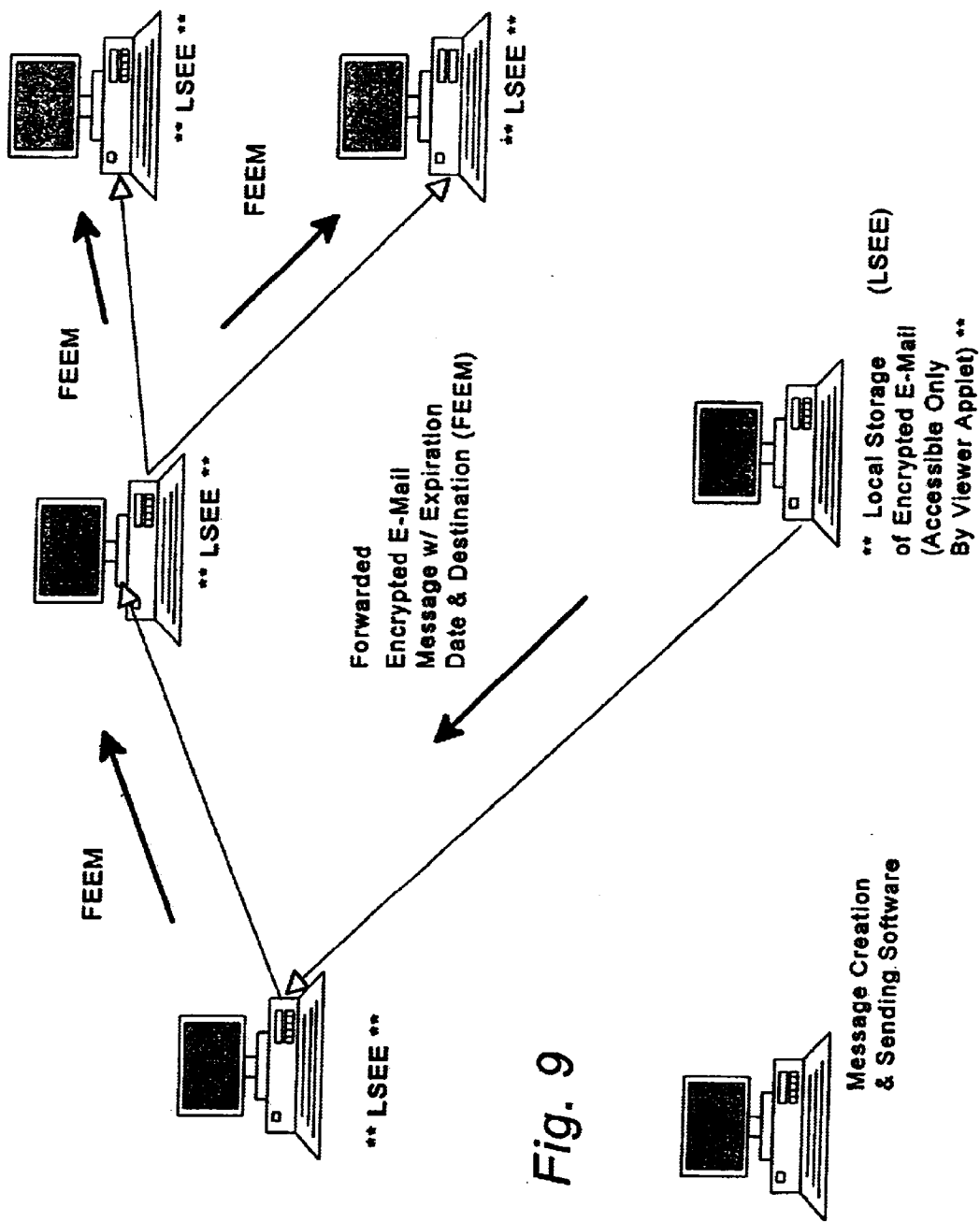
FIGS. 9–11 are schematic views which illustrate the effect obtained by the system and method of the invention.
Figure 10:
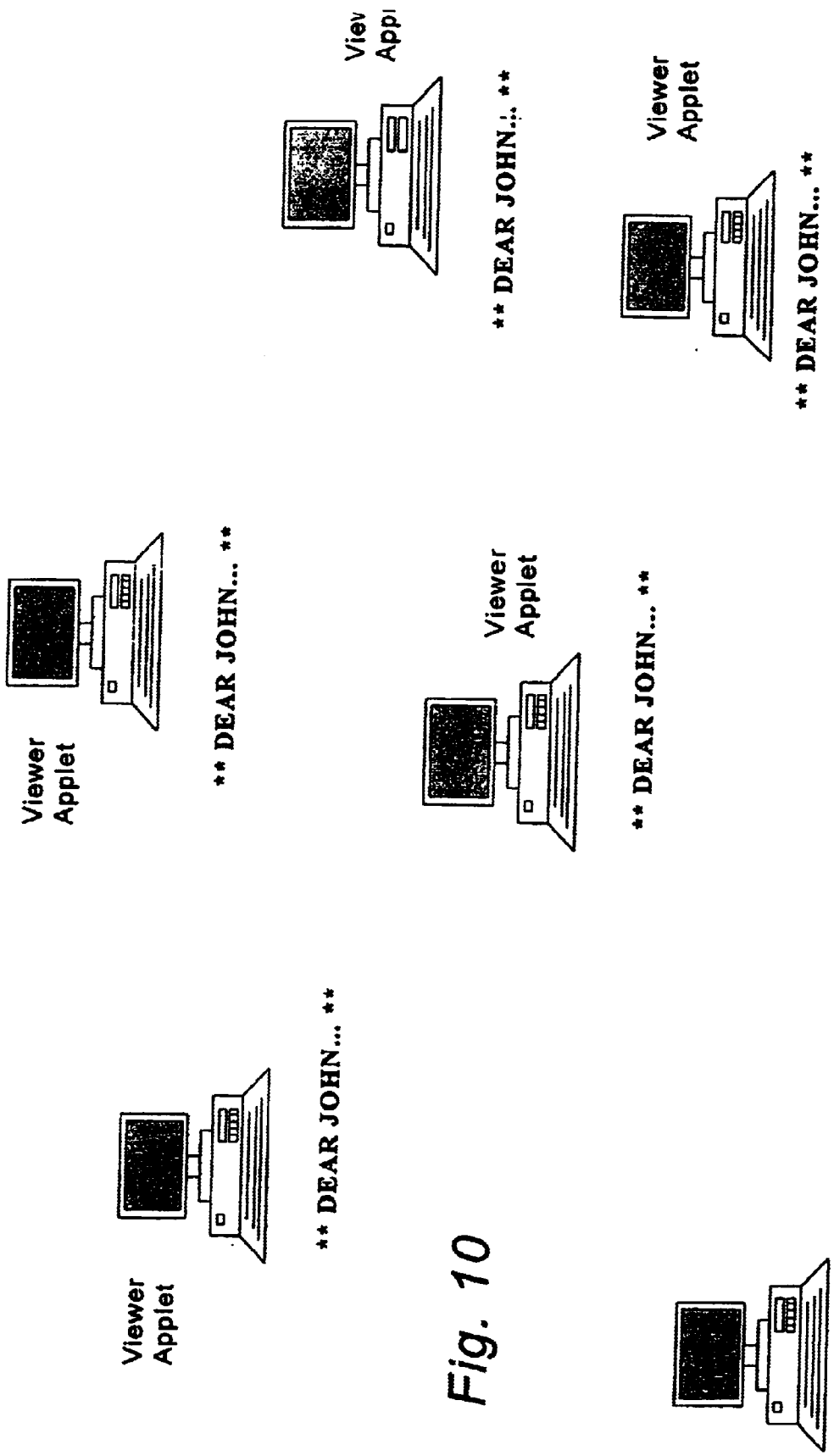
Figure 11:
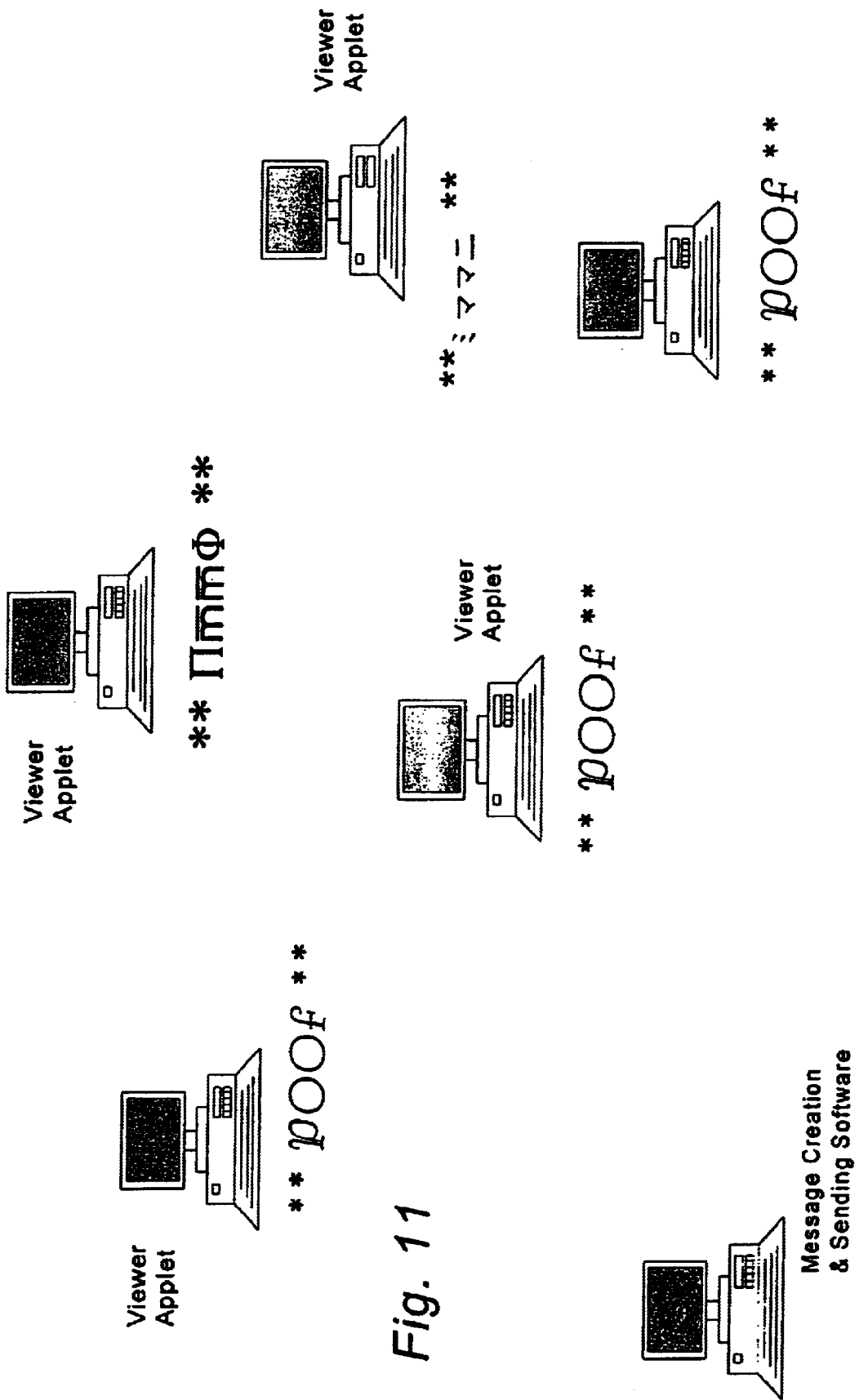

FIGS. 9–11 illustrate the dramatic results achieved by the invention. As shown in FIG. 9, a message is being forwarded to numerous different computers situated in a widely dispersed locations. Although depiction of central electronic mail servers has been deleted from this drawing, it will be appreciated that the message and viewer applet may be forwarded utilizing either of the two principle embodiments of the invention, any of the variations thereof, or combinations of the embodiments. In the header of the original message, and therefore of the forwarded messages, are flags setting an expiration date for the message, permitting or prohibiting forwarding, alteration, printing, or other message handling functions. At some point before the expiration date, as depicted in FIG. 10, the message has been spread around the world and resides in encrypted form either on one or more central servers or in local protected storage. However, on the expiration date, as depicted in FIG. 11, the message is completely expunged from all storage areas (assuming that the originator has not designated selected addresses as exceptions from the expiration requirement), effectively wiping the message off the face of the earth. No existing electronic mail system has this capability.

Figure 17:
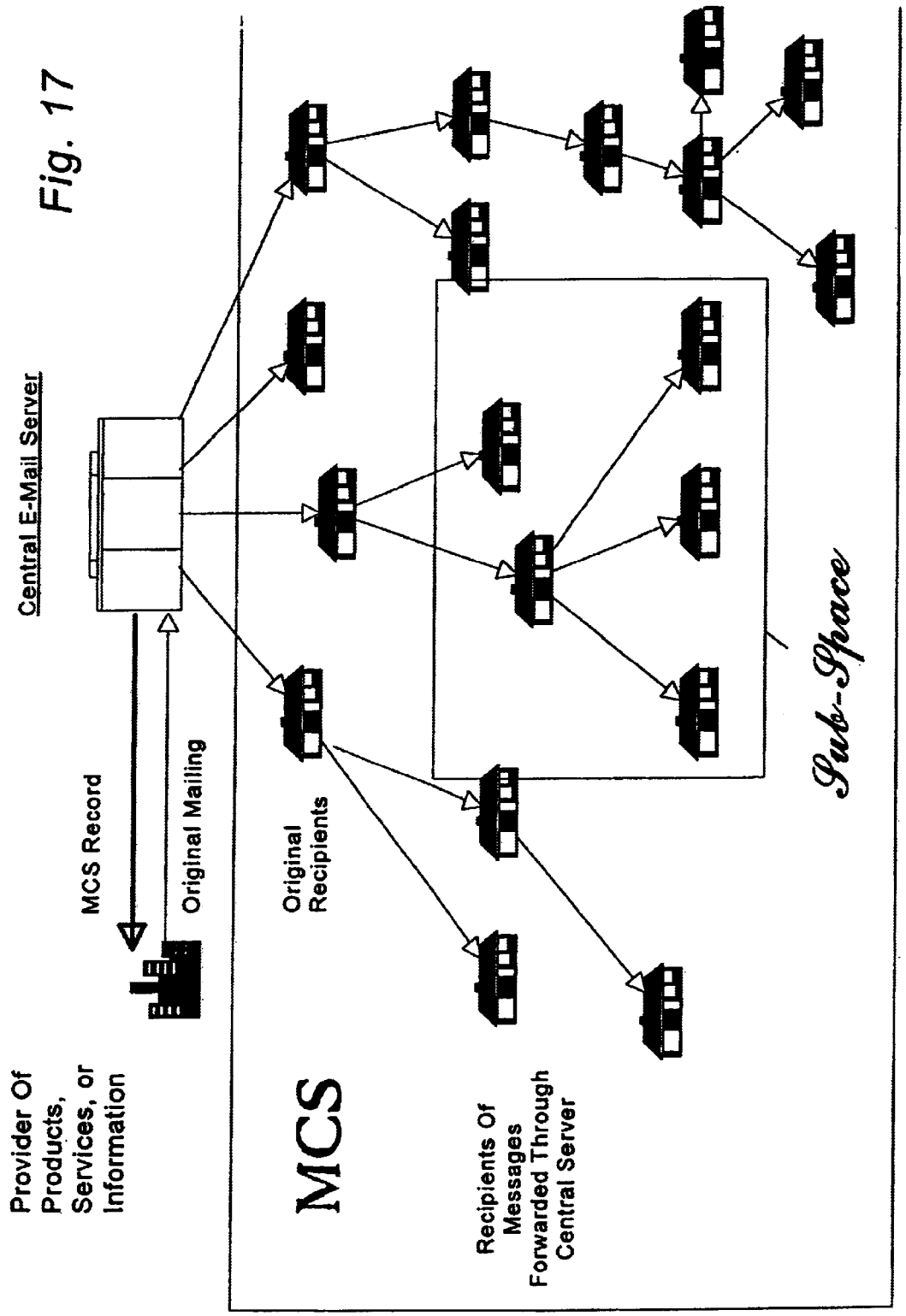
FIG. 17 is a schematic diagram of the manner in which the invention may be used to compile mailing lists and identify affinity groups.

FIG. 17 shows a further capability of the system of the invention, which provides even more dramatic and unexpected results. As illustrated in FIG. 17, the central server of a system corresponding to that of FIGS. 1 or 16, i.e., of a system in which all messages are routed through the central server, keeps a record of all transactions handled by the server, including forwarding of messages, allocation of control and access rights, and so forth. This record may include, without limitation, information concerning who received the message, who forwarded the message, who modified the message, the electronic mail addresses of all of these entities, and the dates and times of all transactions related to the users of the message.

Although simple, the ability to keep records that track a message through all incarnations is unique to the present invention, and has far-reaching effects. For convenience, the above-mentioned set of all transaction information about the usage and handling of the message may be referred to as the message completion space (MCS). Generally, the MCS of a message or group of messages will evolve over time, with some messages being forwarded over and over by an ever expanding set of entities essentially forever, although other messages may never be forwarded. The group of recipients defines an affinity group for the message, and the MCS may be divided into sub-spaces involving different transactions, affinity groups, or sub-groups thereof. For example, the sub-space of interest might be that part of the MCS that originates with a particular individual or group of individuals and includes all of the recipients of messages originally forwarded by the particular individual or group. Alternatively, a subspace could be defined as including all recipients of the message whose electronic mail address is an America OnLine™, who have a ".gov" or ".edu" domain in their electronic mail address, or who have received the message as a result of an nth level forward.

Once records as defined above have been collected, they can be provided to interested parties or subscribers for a variety of uses. Since the affinity group of a message consists entirely of persons who have something in common, namely someone that knew them believed that they would find the message in some way important and took the trouble to forward it to them, which is exactly the type of group that the provider of a service or product seeks to identify in the most efficient possible manner, there should be a high demand for the ability to contact these affinity groups. The following are examples of potential uses for contacting affinity groups:

c) A business could use its own customer electronic mailing list to grow its customer base. Suppose, for example, that Mr. Beer, a home brew supplies sales company, e-mails a new beer recipe to all of its customers, with the opportunity for those customers to e-mail the new recipe on to anybody they think would be interested. That initial mailing has associated with it an MCS, which may be much larger than the original list and which has the amazing characteristic that it consists entirely of people who Mr. Beer's own customers thought would like to have the beer recipe. Furthermore, while the MCS of that mailing may take several months to grow to a stable full size, and may consist of many generations of forwards and re-forwards, once it is in place, it can be used all at once. In a microsecond, this whole new list, consisting entirely of qualified people who might be interested in Mr. Beer, and all of whom are potential new customers, may be contacted via e-mail.

d) Government, political parties, nonprofit societies, church groups, special interest groups, and many other groups built on interest affinities can also use the MCS's generated from their electronic mailing lists to develop their groups.

e) The MCS records also can be used as a basis for varying the controls or limitations placed on a message. For example, the expiration date of a mailing could be extended for anyone in the MCS who has forwarded the message. Alternatively, the MCS records could be used to enable correction, cancellation, or deletion of messages before the predetermined expiration date.

Preferably, each member of an affinity group will have been given the opportunity to opt-in or opt-out of the group, for example by asking the recipient of a message to give permission to be included in the group when requesting keys to view the message, or upon indicating a desire to forward the message.

Having thus described various preferred embodiments of the invention with sufficient particularity to enable those skilled in the art to easily make and use the invention, and having described several possible variations and modifications of the preferred embodiments, it should nevertheless be appreciated that still further variations and modifications of the invention are possible, and that all such variations and modifications should be considered to be within the scope of the invention.

For example, although the present invention is particularly applicable to electronic mail systems, the principles of the first preferred embodiment of the present invention may also be applicable to other types of systems and methods for providing an originator of electronic information with control over a recipient's distribution of the electronic information transmitted via a decentralized computer network connecting the originator with a recipient through a clearinghouse. According to the broadest principles of the first preferred embodiment, the originator of the electronic information assigns control information to the electronic information, the control information being at least one of expiration criteria, distribution criteria, or operation criteria, and the system optionally stores the control information in a first database in communication with the clearing-house, with the clearing-house optionally being accessible to the originator and capable of sending the control information to the recipient. After receiving a control response from the recipient, the control response being generated either automatically or upon input by the user, the system may send a control module in the form of an application or signal from the clearing-house to the recipient based on the control response and the control information. After the control module is installed at the recipient device, the system may send the electronic information to the control module, which may in turn automatically restrict distribution of the electronic information according to the control information. The recipient device can then play the electronic information according to the control information.

Consequently, those skilled in the art will appreciate that, in view of the numerous modifications and variations that can be made without departing from the above principles, the scope of the invention should not be limited by the above description, but rather should be interpreted solely in accordance with the appended claims.

What is claimed is:

1. Electronic mail control software, comprising:

means for opening a window arranged to enable a user of the electronic mail applications program to select
(i) an original destination address to which an electronic mail message created using the electronic mail applications program is to be sent, and
(ii) control options to be applied to the electronic mail message; and means for causing the electronic mail control software to automatically substitute, without manual entry of a substitute address by the user, an address of a central mail server for the original destination address selected by the user in order to divert said electronic mail message to said central mail server, said original destination address being appended by the electronic mail control software to the message so that it can be read by the central mail server, the central mail server being arranged to forward said electronic mail message to said original destination address and to implement said control options if one of said control options is selected.

2. Electronic mail control software as claimed in claim 1, wherein said control options include an expiration setting by which the user may select a date, time, or event, the occurrence of which will cause said message to expire.

3. Electronic mail control software as claimed in claim 1, wherein said control options include limitations on forwarding by a recipient of said message.

4. Electronic mail control software as claimed in claim 1, wherein said means for opening said window includes means for intercepting a send command generated by said electronic mail applications program and opening said window in response to interception of said send command.

5. Electronic mail control software as claimed in claim 1, further comprising means for modifying at least one entry in an address book of said electronic mail applications program to cause mail sent to said entry to be routed through said electronic mail server.

6. A method of adding lifespan and handling limitations to an electronic mail message, comprising the step of:

opening a window arranged to enable a user of the electronic mail applications program to select
(i) an original destination address to which an electronic mail message created using the electronic mail application program is to be sent, and
(ii) control options to be applied to the electronic mail message,
wherein, when one of said control options is selected by the user, the electronic mail application program automatically substitutes, without further entry of an address by the user, an address of a central mail server for the original destination address and appends the original destination address to the electronic mail message in order to divert the electronic mail message to a central mail server arranged to read the original destination address and forward the electronic mail message to said original destination address and to implement said control options.

7. A method as claimed in claim 6, wherein said control options include an expiration setting by which the user may select a date, time, or event, the occurrence of which will cause said message to expire.

8. A method as claimed in claim 6, wherein said control options include limitations on forwarding by a recipient of said message.

9. A method as claimed in claim 6, wherein the step of opening said window includes the step of intercepting a send command generated by said electronic mail applications program and opening said window in response to interception of said send command.

10. A method as claimed in claim 6, further comprising the step of modifying at least one entry in an address book of said electronic mail applications program to cause mail sent to said entry to be routed through said electronic mail server.

11. An electronic mail system, comprising:
a first computer on which is installed message origination software and which is connected to a network capable of carrying an electronic mail wrapper that includes an electronic mail message;
at least one recipient computer also connected to said network; and
a viewer applet installed on said recipient computer,
said viewer applet being arranged to decode control information appended to the electronic mail wrapper, search for sender-identity and message-origination fields in said wrapper and control, based on input to said message origination software, a manner in which information items in said sender-identity and message-origination fields in said wrapper are presented to a recipient of the message, said control including selection of which of said information items in said sender-identity and message-origination fields are to be presented, and control of coupling of the information and the message.

12. An electronic mail system as claimed in claim 11, further comprising a central electronic mail server connected to said network, said electronic mail server being arranged to cooperate with said viewer applet to achieve said control of the manner in which the electronic mail wrapper is presented to the recipient.

13. An electronic mail system as claimed in claim 12, wherein upon request by the recipient, said central mail server encrypts said electronic mail message and sends it to said viewer applet, and said viewer applet being arranged to decrypt said message so as to display said message with information deleted from said wrapper.

14. A method of controlling an electronic mail message transmitted over a network comprising the steps of:

before transmission of the electronic mail message over the network, enabling a user to attach limitations on processing and handling of the electronic mail message by a recipient;
initially transmitting said electronic mail message over said network to a central electronic mail server;
storing said electronic mail message at said electronic mail server;
upon request by the recipient, causing said electronic mail server to encrypt said electronic mail message;
causing the electronic mail server to send the encrypted electronic mail message to a viewer applet installed on said recipient computer;
causing the viewer applet to store said encrypted message on the recipient computer;
causing the viewer applet to enable viewing of said message by decrypting said electronic mail message using the viewer applet and a session key supplied by the central electronic mail server, wherein said message cannot be viewed by the recipient unless the viewer applet is used; and
causing said central electronic mail server and viewer applet to implement said processing and handling limitations.

15. A method as claimed in claim 14, wherein said session key is supplied by said central server each time said message is to be viewed.

16. A method as claimed in claim 14, wherein said session key must be renewed periodically in order to view said message.

17. A method as claimed in claim 14, wherein said viewer applet is required to establish communications with the central server periodically in order to ensure that a clock used by the viewer applet is functioning properly.

18. An electronic mail system, comprising:
A first computer on which is installed message origination software arranged to assign message processing limitations to an electronic mail message and which is connected to a network capable of carrying said electronic mail message;
at least one recipient computer also connected to said network;
w viewer applet; and
w central electronic mail server connected to said network, said message origination software being arranged to send said electronic mail message to said electronic mail server, said electronic mail server being arranged to store information concerning said electronic mail message and, upon request by the recipient, encrypt said electronic mail message and send it to said viewer applet, wherein said viewer applet is arranged to decrypt said electronic mail message as it is sent so as to display said message, wherein said viewer applet is also arranged to store at least a portion of said message that has been stripped of said information by said central server, wherein said message can only be viewed by the recipient using the viewer applet, and wherein said processing limitations are implemented by said central electronic mail server and said viewer applet.

19. An electronic mail system as claimed in claim 18, wherein said message is encrypted by said central mail server using a public key generated by the viewer applet, said viewer applet being arranged to generate said public key and also a corresponding private key used to decrypt said message.

20. An electronic mail system as claimed in claim 18, wherein said viewer applet is further arranged to permit a user to request forwarding of said electronic mail message to a second recipient computer, said central mail server being arranged to strip and store information concerning said message, a copy of the viewer applet installed on said second recipient computer being arranged to store said stripped message.

21. A method of controlling an electronic mail message transmitted over a network, comprising the steps of:

before transmission of the electronic mail message over the network, attaching limitations on processing and handling of the electronic mail message by a recipient;

initially transmitting said electronic mail message over said network to a central electronic mail server;

storing said electronic mail message at said electronic mail server;

upon request by the recipient, encrypting said electronic mail message, sending the encrypted electronic mail message to a viewer applet installed on said recipient computer, and decrypting said electronic mail message as it is received by the viewer applet so as to display said message; and causing said central server and viewer applet to implement said processing and handling limitations.

22. A method of controlling an electronic mail message as claimed in claim 21, further comprising the steps of encrypting said electronic mail message is carried out by said central electronic mail server using a public key generated by the viewer applet, said viewer applet being arranged to generate said public key and also a corresponding private key used to decrypt said message.

23. A method of controlling an electronic mail message as claimed in claim 21, further comprising g the steps of causing said viewer applet to request forwarding of said electronic mail message stored on said central mail server to a second recipient computer, encrypting said electronic mail message using a public key of a copy of said viewer applet installed on said second recipient computer, and sending said stripped electronic message to said second recipient computer for storage in a memory of the second recipient computer.

24. A method of developing mailing lists, comprising the steps of:

sending an electronic mail message to an initial list of recipients;

requiring that versions of said electronic mail message that are forwarded to first additional recipients by said initial recipients be routed through at least one central mail server, said first additional recipients including recipients initially unknown to the sender and the central mail server;

requiring that versions of said electronic mail message that are forwarded to second additional recipients by said first additional recipients be routed through said at least one central mail server, said second additional recipients including further recipients initially unknown to the sender and the central mail server;

tracking all transactions involving said electronic mail message, including transactions by said original recipients, said first additional recipients, and said second additional recipients; and using a record of at least a portion of said transactions to expand said electronic mailing list to recipients not on the initial mailing list, and not initially known to the sender or to the central mail server.

25. A method as claimed in claim 24, further comprising the steps of: before initial transmission of said message, attaching handling limitations to said message; and encrypting said message so that it can only be viewed by a viewer applet supplied by said central server.

26. A method as claimed in claim 24, further comprising the steps of: before transmission of the electronic mail message over an open network, attaching to the message a date, time, or event, the occurrence of which will cause said electronic mail message and all designated incarnations thereof to expire; and encrypting said electronic mail message so that it can only be viewed before the occurrence of said time, date, or even using a viewer applet installed on a recipient computer.

27. A method as claimed in claim 24, wherein said record includes all addresses to which said message has been forwarded.

28. A method as claimed in claim 24, wherein said record includes a subset of the addresses to which said message has been forwarded.

29. A method as claimed in claim 24, further comprising the step of selling said expanded list.

* * * * *